United States Patent
Barnett, Jr.

(10) Patent No.: US 10,110,272 B2
(45) Date of Patent: Oct. 23, 2018

(54) WEARABLE GESTURE CONTROL DEVICE AND METHOD

(71) Applicant: CenturyLink Intellectual Property LLC, Denver, CO (US)

(72) Inventor: Thomas Charles Barnett, Jr., Monroe, LA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 24 days.

(21) Appl. No.: 15/383,623

(22) Filed: Dec. 19, 2016

(65) Prior Publication Data
US 2018/0062691 A1    Mar. 1, 2018

Related U.S. Application Data

(60) Provisional application No. 62/379,090, filed on Aug. 24, 2016.

(51) Int. Cl.
*G06F 3/0482* (2013.01)
*H04B 1/401* (2015.01)
(Continued)

(52) U.S. Cl.
CPC ............. *H04B 1/401* (2013.01); *G06F 3/017* (2013.01); *G06F 3/0488* (2013.01); *G06F 3/167* (2013.01);
(Continued)

(58) Field of Classification Search
None
See application file for complete search history.

(56) References Cited

U.S. PATENT DOCUMENTS

| | | |
|---|---|---|
| 5,717,955 A | 2/1998 | Swinehart |
| 6,792,319 B1 | 9/2004 | Bilger |

(Continued)

FOREIGN PATENT DOCUMENTS

| | | |
|---|---|---|
| CN | 101799987 B | 11/2011 |
| KR | 2015-0128346 A | 11/2015 |

(Continued)

OTHER PUBLICATIONS

International Search Report and Written Opinion prepared by the Korean Intellectual Property Office as International Searching Authority for PCT Intl Patent App. No. PCT/US2016/067938 dated Mar. 31, 2017; 11 pages.

(Continued)

*Primary Examiner* — David Bilodeau
(74) *Attorney, Agent, or Firm* — Swanson & Bratschun, L.L.C.

(57) ABSTRACT

Novel tools and techniques are provided for implementing Internet of Things ("IoT") functionality. In some embodiments, a wearable control device ("WCD") might receive first user input comprising one or more of touch, gesture, and/or voice input from the user. The WCD (and/or a remote computing system ("RCS")) might analyze the first user input to identify a user device of a plurality of user devices to remotely control. The WCD might establish wireless communications with the identified user device, and might reconfigure its user interface to provide the user with command options to control the user device. The WCD might receive second user input. The WCD (and/or the RCS) might analyze the second user input to identify one or more functionalities of the user device to invoke, and might generate first command instructions, which might be sent by the WCD to the user device, via the wireless communications.

26 Claims, 11 Drawing Sheets

(51) Int. Cl.
*H04B 1/3827* (2015.01)
*H04W 4/00* (2018.01)
*H04M 1/725* (2006.01)
*G06F 3/01* (2006.01)
*G06F 3/16* (2006.01)
*G06F 3/0488* (2013.01)
*H04W 4/80* (2018.01)

(52) U.S. Cl.
CPC .......... *H04B 1/385* (2013.01); *H04M 1/7253* (2013.01); *H04M 1/72533* (2013.01); *H04W 4/008* (2013.01); *H04W 4/80* (2018.02); *G06F 3/0482* (2013.01); *G06F 2203/0381* (2013.01); *G06F 2203/0384* (2013.01)

(56) References Cited

U.S. PATENT DOCUMENTS

| | | | |
|---|---|---|---|
| 7,030,781 B2 | 4/2006 | Jones | |
| 7,096,003 B2 | 8/2006 | Joao | |
| 7,397,363 B2 | 7/2008 | Joao | |
| 8,296,383 B2 | 10/2012 | Lindahl | |
| 8,380,652 B1 | 2/2013 | Francis, Jr. | |
| 8,654,936 B1* | 2/2014 | Eslambolchi | H04L 12/2818 |
| | | | 379/88.04 |
| 9,298,410 B2 | 3/2016 | Juchem | |
| 9,432,340 B1 | 8/2016 | Tutt et al. | |
| 9,456,276 B1 | 9/2016 | Chhetri | |
| 9,860,677 B1 | 1/2018 | Agerstam et al. | |
| 9,917,903 B2 | 3/2018 | Clernon | |
| 2001/0029311 A1 | 10/2001 | Khare | |
| 2002/0024450 A1 | 2/2002 | Townsend | |
| 2003/0061029 A1 | 3/2003 | Shaket | |
| 2004/0083054 A1 | 4/2004 | Jones | |
| 2004/0113773 A1 | 6/2004 | Nieters | |
| 2004/0160319 A1 | 8/2004 | Joao | |
| 2005/0248444 A1 | 11/2005 | Joao | |
| 2007/0079113 A1 | 4/2007 | Kulkarni et al. | |
| 2008/0234878 A1 | 9/2008 | Joao | |
| 2008/0256008 A1 | 10/2008 | Kwok | |
| 2008/0303654 A1 | 12/2008 | Kates | |
| 2009/0121860 A1 | 5/2009 | Kimmel | |
| 2009/0327910 A1* | 12/2009 | Black | H04L 12/282 |
| | | | 715/744 |
| 2010/0124332 A1 | 5/2010 | Arena | |
| 2010/0217604 A1 | 8/2010 | Baldwin et al. | |
| 2010/0325421 A1 | 12/2010 | Park et al. | |
| 2011/0106321 A1 | 5/2011 | Cherian | |
| 2011/0288684 A1 | 11/2011 | Farlow | |
| 2012/0086563 A1* | 4/2012 | Arling | G06F 3/0486 |
| | | | 340/12.52 |
| 2012/0265370 A1 | 10/2012 | Kim | |
| 2013/0217421 A1 | 8/2013 | Kim | |
| 2013/0238326 A1 | 9/2013 | Kim et al. | |
| 2014/0167931 A1 | 6/2014 | Lee et al. | |
| 2014/0180478 A1 | 6/2014 | Letsky | |
| 2014/0188463 A1 | 7/2014 | Noh et al. | |
| 2014/0343950 A1 | 11/2014 | Simpson et al. | |
| 2015/0249672 A1 | 9/2015 | Burns et al. | |
| 2015/0262102 A1 | 9/2015 | Tann | |
| 2015/0298654 A1 | 10/2015 | Joao | |
| 2015/0350247 A1 | 12/2015 | Adler et al. | |
| 2015/0365278 A1 | 12/2015 | Chakrabarti et al. | |
| 2016/0021127 A1 | 1/2016 | Yan | |
| 2016/0029346 A1 | 1/2016 | Suresh et al. | |
| 2016/0187995 A1 | 6/2016 | Rosewall | |
| 2016/0195876 A1 | 7/2016 | Mattsson | |
| 2016/0212613 A1 | 7/2016 | Huang | |
| 2016/0226674 A1 | 8/2016 | Kangshang et al. | |
| 2016/0248746 A1 | 8/2016 | James | |
| 2016/0278599 A1 | 9/2016 | Seo | |
| 2016/0294828 A1 | 10/2016 | Zakaria | |
| 2016/0295364 A1 | 10/2016 | Zakaria | |
| 2016/0329040 A1 | 11/2016 | Whinnery | |
| 2016/0330042 A1 | 11/2016 | Andersen | |
| 2016/0352526 A1 | 12/2016 | Adler et al. | |
| 2016/0359965 A1 | 12/2016 | Murphy et al. | |
| 2017/0006141 A1 | 1/2017 | Bhadra | |
| 2017/0006643 A1 | 1/2017 | Zakaria et al. | |
| 2017/0026157 A1 | 1/2017 | Bugenhagen et al. | |
| 2017/0026472 A1 | 1/2017 | Bugenhagen et al. | |
| 2017/0060369 A1* | 3/2017 | Goyal | G06F 3/011 |
| 2017/0093866 A1 | 3/2017 | Ben-Noon | |
| 2017/0110784 A1 | 4/2017 | Vermes et al. | |
| 2017/0134937 A1 | 5/2017 | Miller | |
| 2017/0141575 A1 | 5/2017 | Fulton | |
| 2017/0171747 A1 | 6/2017 | Britt et al. | |
| 2017/0181383 A1 | 6/2017 | Shen | |
| 2017/0187807 A1 | 6/2017 | Clernon | |
| 2017/0192437 A1 | 7/2017 | Bier | |
| 2017/0195318 A1 | 7/2017 | Liu | |
| 2017/0201504 A1 | 7/2017 | Funk | |
| 2017/0206900 A1 | 7/2017 | Lee et al. | |
| 2017/0253258 A1 | 9/2017 | Bramucci | |
| 2017/0279620 A1 | 9/2017 | Kravitz et al. | |
| 2017/0300953 A1 | 10/2017 | Kim | |
| 2017/0345420 A1 | 11/2017 | Barnett, Jr. | |
| 2017/0358025 A1 | 12/2017 | Varma | |
| 2018/0040172 A1 | 2/2018 | Funk | |
| 2018/0084596 A1 | 3/2018 | Schwengler et al. | |
| 2018/0103579 A1 | 4/2018 | Grufman | |
| 2018/0122506 A1 | 5/2018 | Grantcharov | |
| 2018/0168464 A1 | 6/2018 | Barnett, Jr. et al. | |
| 2018/0178781 A1 | 6/2018 | Funk et al. | |
| 2018/0181091 A1 | 6/2018 | Funk et al. | |
| 2018/0181094 A1 | 6/2018 | Funk et al. | |
| 2018/0181095 A1 | 6/2018 | Funk et al. | |
| 2018/0183685 A1 | 6/2018 | Cook | |
| 2018/0183874 A1 | 6/2018 | Cook | |
| 2018/0188704 A1 | 7/2018 | Cella et al. | |

FOREIGN PATENT DOCUMENTS

| | | |
|---|---|---|
| WO | WO-2009-098676 | 8/2009 |
| WO | WO-2013-058648 | 4/2013 |
| WO | WO-2017/123392 A1 | 7/2017 |

OTHER PUBLICATIONS

International Search Report and Written Opinion prepared by the Korean Intellectual Property Office as International Searching Authority for PCT International Patent Application No. PCT/US2017/034531 dated Aug. 29, 2017; 18 pages.

International Preliminary Report on Patentability, PCT/US2016/067938, dated Jul. 26, 2018, 8 pages.

Alexander, Chris, et al., Improved User Authentication in Off-The-Record Messaging, 2009, 7 pages.

Bersch, Christian, et al., Bimanual Robotic Cloth Manipulation for Laundry Folding, 2011, 7 pages.

Borisov, Nikita, et al., Communication, or, Why Not to Use PGP, 2004, 8 pages.

De Raimondo, Mario, et al., Secure Off-the-Record Messaging, 2005, 9 pages.

Goldberg, Ian, et al., Multi-party Off-the-Record Messaging, 2007, 11 pages.

* cited by examiner

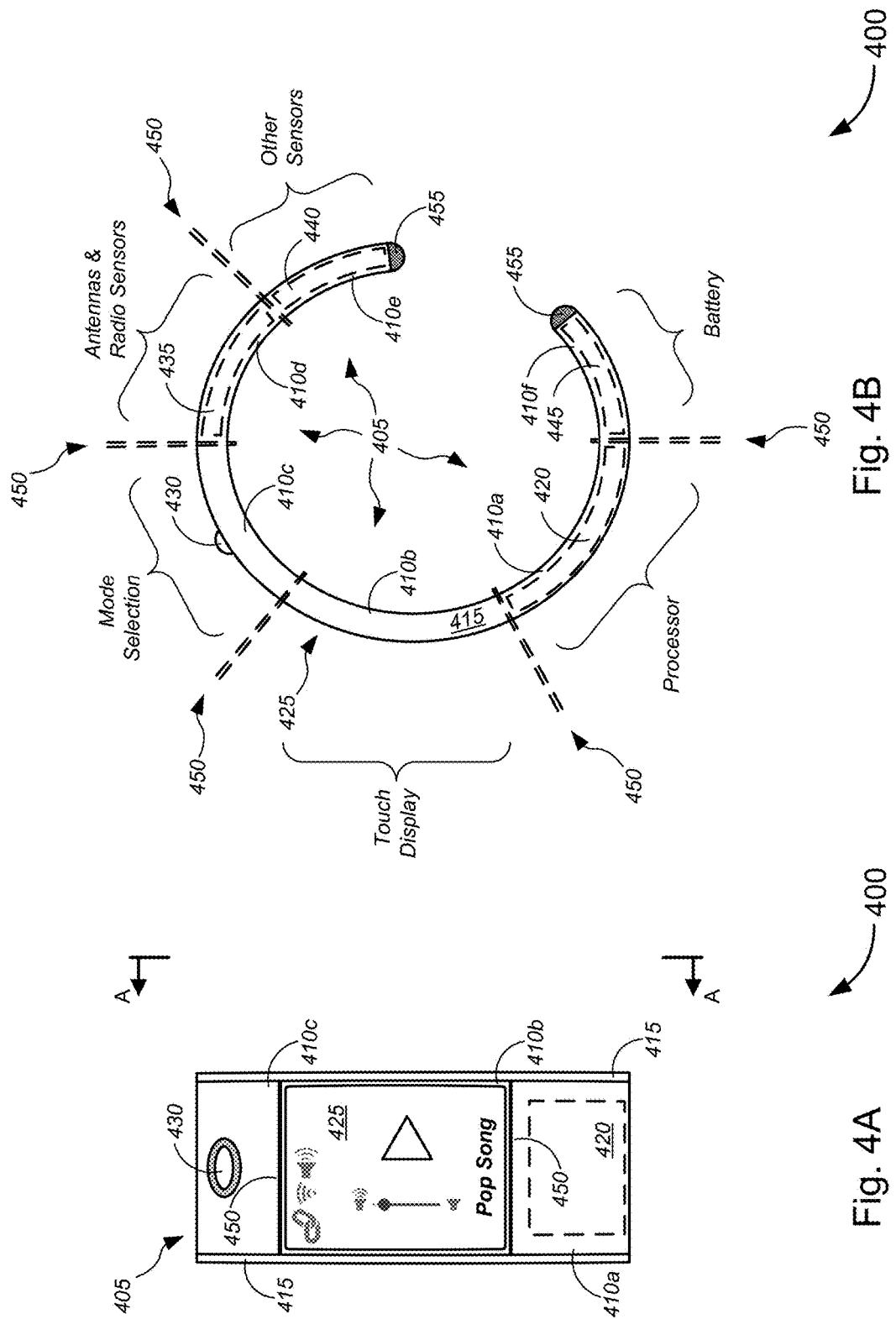

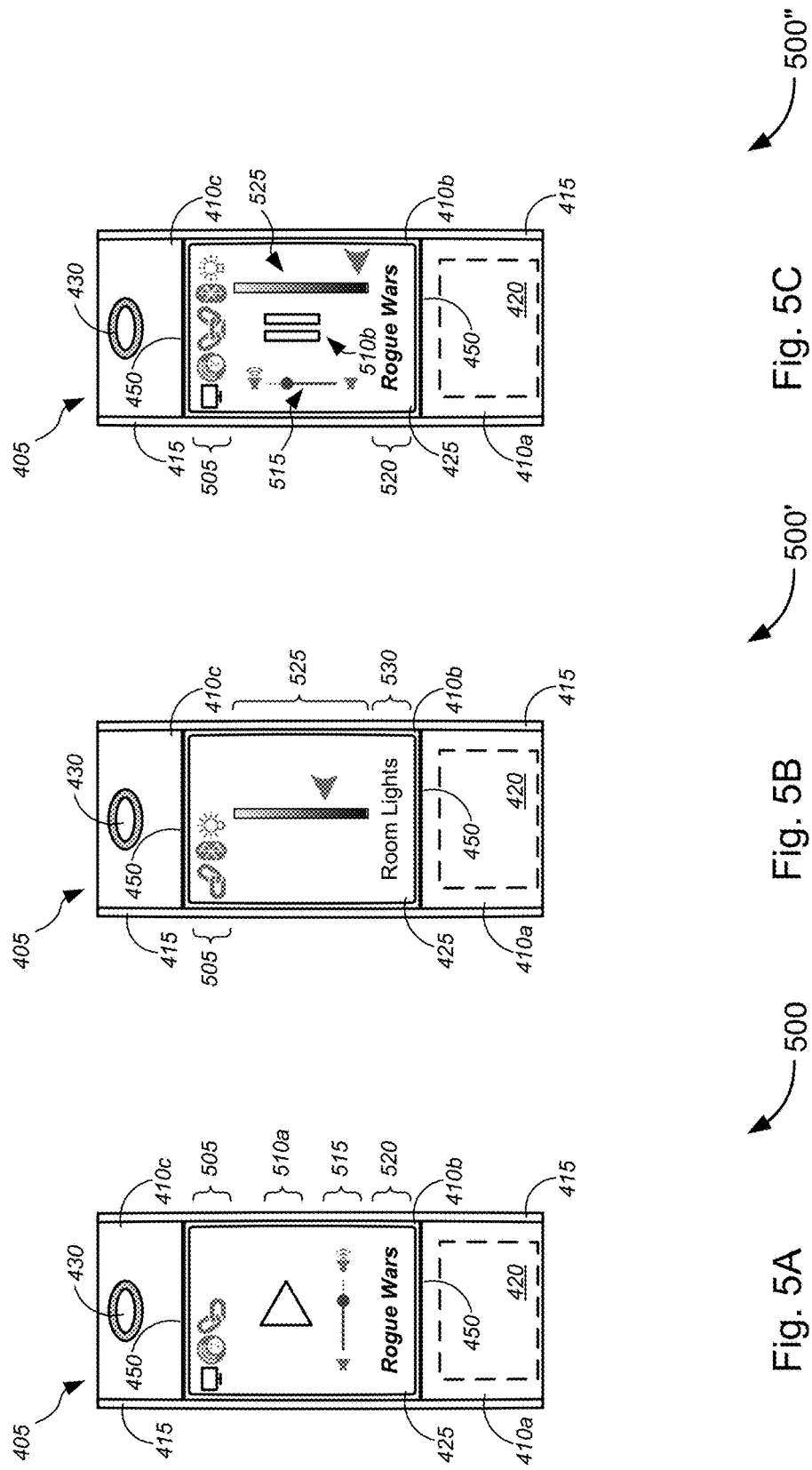

WEARABLE GESTURE CONTROL DEVICE AND METHOD

CROSS-REFERENCES TO RELATED APPLICATIONS

This application claims priority to U.S. Patent Application Ser. No. 62/379,090 (the "'9090 application"), filed Aug. 24, 2016 by Thomas Charles Barnett, Jr. entitled, "Wearable Gesture Control Device with Associative Touchscreen Remote," the disclosure of which is incorporated herein by reference in its entirety for all purposes.

This application may be related to each of U.S. patent application Ser. No. 14/946,540 (the "'540 Application"), filed on Nov. 19, 2015 by Michael K. Bugenhagen et al. and titled, "Customer Based Internet of Things (IOT)", which claims priority to U.S. Patent Application Ser. No. 62/196,086 (the "'086 Application"), filed Jul. 23, 2015 by Michael K. Bugenhagen et al. and titled, "Customer Based Internet of Things (IOT)"; U.S. patent application Ser. No. 14/946,548 (the "'548 Application"), filed on Nov. 19, 2015 by Michael K. Bugenhagen et al. and titled, "Customer Based Internet of Things (IOT)—Transparent Privacy Functionality", which claims priority to U.S. Patent Application Ser. No. 62/196,090 (the "'090 Application"), filed Jul. 23, 2015 by Michael K. Bugenhagen and titled, "Customer Based Internet of Things (IOT)—Transparent Privacy Functionality"; and U.S. patent application Ser. No. 15/084,805 (the "'805 Application"), filed on Mar. 30, 2016 by Tom Funk and titled, "System and Method for Implementing Secure Communications for Internet of Things (IOT) Devices", which claims priority to U.S. Patent Application Ser. No. 62/277,245 (the "'245 Application"), filed Jan. 11, 2016 by Tom Funk and titled, "IoT Security through Combining TOR Messenger with MQTT or Additional Protocols". This application may be related to U.S. patent application Ser. No. 15/370,764 (the "'764 application"), filed Dec. 6, 2016 by Thomas C. Barnett, Jr. and titled, "Internet of Things (IoT) Human Interface Apparatus, System, and Method", which claims priority to U.S. Patent Application Ser. No. 62/342,710 (the "'710 application"), filed May 27, 2016 by Thomas C. Barnett, Jr. and titled, "Internet of Things (IoT) Human Interface Apparatus, System, and Method". This application may also be related to U.S. Patent Application Ser. No. 62/397,086 (the "'7086 application"), filed Sep. 20, 2016 by Thomas Schwengler et al. and titled, "Universal Wireless Station for Multiple Simultaneous Wireless Services" and U.S. Patent Application Ser. No. 62/403,878 (the "'878 application"), filed Oct. 4, 2016 by Thomas Schwengler et al. and titled, "Universal Wireless Station for Multiple Simultaneous Wireless Services".

This application may also be related to each of U.S. patent application Ser. No. 14/678,208 (the "'208 application"), filed Apr. 3, 2015 by Michael J. Fargano et al. and titled, "Network Functions Virtualization Interconnection Gateway", which claims priority to U.S. Patent Application Ser. No. 61/974,927, filed Apr. 3, 2014 by Michael J. Fargano and titled, "Network Functions Virtualization Interconnection Gateway"; U.S. patent application Ser. No. 14/678,280 (the "'280 application"), filed on Apr. 3, 2015 by Michael J. Fargano et al. and titled, "Network Functions Virtualization Interconnection Hub", which claims priority to U.S. Patent Application Ser. No. 61/974,930, filed Apr. 3, 2014 by Michael J. Fargano and titled, "Network Functions Virtualization Interconnection Hub"; and U.S. patent application Ser. No. 14/678,309 (the "'309 application"), filed Apr. 3, 2015 by Michael J. Fargano et. al and titled, "Customer Environment Network Functions Virtualization (NFV)", which claims priority to U.S. Patent Application Ser. No. 61/976,896, filed Apr. 8, 2014 by Michael J. Fargano and titled, "Customer Environment Network Functions Virtualization (NFV)" and U.S. Patent Application Ser. No. 61/977,820, filed Apr. 10, 2014 by Michael J. Fargano and titled, "Customer Environment Network Functions Virtualization (NFV)".

This application may be related to each of U.S. patent application Ser. No. 14/730,695 (the "'695 application"), filed Jun. 4, 2015 by Charles I. Cook et al. and titled, "Remoting Application Servers", which claims priority to U.S. Patent Application Ser. No. 62/037,096, filed Aug. 13, 2014 by Charles I. Cook et al. and titled, "Remoting Application Servers"; U.S. patent application Ser. No. 14/983,884 (the "'884 application"), filed Dec. 30, 2015 by Kevin M. McBride et al. and titled, "Intent-Based Services Orchestration", which claims priority to U.S. Patent Application Ser. No. 62/233,911, filed Sep. 28, 2015 by Kevin M. McBride et al. and titled, "Intent-Based Services Orchestration" and U.S. Patent Application Ser. No. 62/247,294, filed Oct. 28, 2015 by Kevin M. McBride et al. and titled, "Intent-Based Services Orchestration"; and U.S. patent application Ser. No. 14/983,758 (the "'758 application"), filed Dec. 30, 2015 by Michael K. Bugenhagen and titled, "Virtual Machine-To-Port Peripheral Device Driver", which claims priority to U.S. Patent Application Ser. No. 62/237,981, filed Oct. 6, 2015 by Michael K. Bugenhagen and titled, "NFV Peripheral Network Driver for VNF's".

This application may also be related to each of U.S. patent application Ser. No. 15/148,688 (the "'688 application"), filed on May 6, 2016 by Charles I. Cook et al. and titled, "System and Method for Implementing Network Enhanced Gateway Functionality"; U.S. patent application Ser. No. 15/148,705 (the "'705 application"), filed on May 6, 2016 by Charles I. Cook et al. and titled, "System and Method for Implementing Extension of Customer LAN at Provider Network Service Point"; U.S. patent application Ser. No. 15/148,711 (the "'711 application"), filed May 6, 2016 by Charles I. Cook et al. and titled, "System and Method for Implementing Isolated Service Overlays between Provider Network Service Point and Customer Premises"; U.S. patent application Ser. No. 15/148,721 (the "'721 application"), filed on May 6, 2016 by Charles I. Cook et al. and titled, "System and Method for Implementing Network Experience Shifting"; and U.S. patent application Ser. No. 15/222,623 (the "'623 application"), filed Jul. 28, 2016 by Michael K. Bugenhagen et al. and titled, "System and Method for Implementing Customer Control Point or Customer Portal". Each of the '688, '705, '711, and '721 applications claim priority to each of U.S. Patent Application Ser. No. 62/157,795 (the "'795 application"), filed May 6, 2015 by Charles I. Cook et al. and titled, "NFVI Enhanced Open Business/Residential Gateways and Customer Portal", U.S. Patent Application Ser. No. 62/159,788 (the "'788 application"), filed May 11, 2015 by Charles I. Cook et al. and titled, "NFVI Enhanced Open Business/Residential Gateways and Customer Portal", U.S. Patent Application Ser. No. 62/172,359 (the "'359 application"), filed Jun. 8, 2015 by Charles I. Cook et al. and titled, "Enhanced LAN With Customer Portal Control". The '721 application further claims priority to U.S. Patent Application Ser. No. 62/299,346 (the "'346 application"), filed Feb. 24, 2016 by Charles I. Cook et al. and titled, "Experience Shifting". The '623 application claims priority to the '346 application and to U.S. Patent Application Ser. No. 62/299,357 (the "'357 application"), filed Feb. 24, 2016 by Michael K. Bugenhagen et al. and titled, "Control Point or Customer Portal".

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing Internet of Things functionality, and, in particular embodiments, to methods, systems, apparatus, and computer software for implementing wearable control functionality.

BACKGROUND

Although remote control devices (e.g., universal remote control devices) are currently available on the market, such conventional remote control devices do not appear to be wearable remote control devices, nor do they appear to remotely control anything other than televisions, media recording and/or playback devices, set-top-boxes, etc. In particular, such conventional remote control devices do not appear to control such media content presentation devices while also being able to control household appliances, kitchen appliances, mobile devices, vehicles, and/or the like, much less providing one or more of gesture control, voice control, and/or touch control for such wide variety of user devices.

Hence, there is a need for more robust and scalable solutions for implementing Internet of Things functionality, and, in particular embodiments, to methods, systems, apparatus, and computer software for implementing wearable control functionality.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A and 4B are schematic diagrams illustrating various views of an exemplary embodiment of a wearable control device, in accordance with various embodiments.

FIGS. 5A-5C are schematic diagrams illustrating various user interfaces on the exemplary wearable control device of FIG. 4A for implementing various exemplary embodiments for remotely controlling various user devices, in accordance with various embodiments.

DETAILED DESCRIPTION OF CERTAIN EMBODIMENTS

Overview

Figure 1:
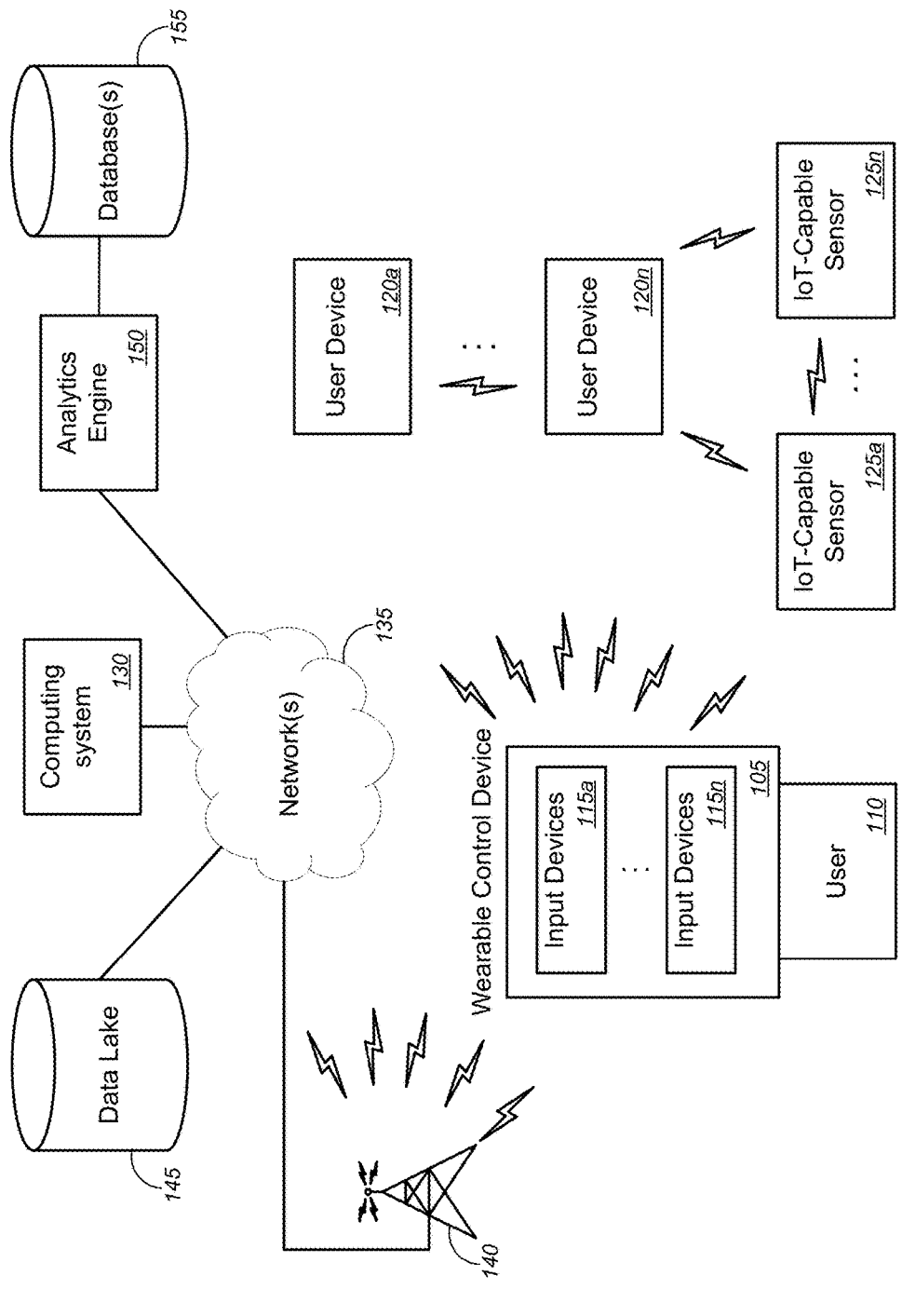
FIG. 1 is a schematic diagram illustrating a system for implementing wearable control functionality, in accordance with various embodiments.

Various embodiments provide tools and techniques for implementing Internet of Things functionality, and, in particular embodiments, to methods, systems, apparatus, and computer software for implementing wearable control functionality.

In various embodiments, a wearable control device (when worn by a user) might receive first user input comprising one or more of touch, gesture, and/or voice input from the user. The wearable control device (and/or a remote computing system) might analyze the first user input to identify a first user device of a plurality of user devices to remotely control. The wearable control device might establish wireless communications with the identified first user device, and might reconfigure its user interface to provide the user with command options to control the first user device. The wearable control device might receive second user input comprising one or more of touch, gesture, and/or voice input. The wearable control device (and/or the remote computing system) might analyze the second user input to identify one or more first functionalities of a first plurality of functionalities of the first user device to invoke, and might generate first command instructions. The wearable control device might send the generated first command instructions to the first user device, via the wireless communications.

According to some embodiments, the wearable control device (when worn by the user) might further receive third user input comprising one or more of touch, gesture, and/or voice input from the user. The wearable control device (and/or a remote computing system) might analyze the third user input to identify a second user device of the plurality of user devices to remotely control. The wearable control device might establish wireless communications with the identified second user device, and might reconfigure its user interface to provide the user with command options to control the second user device. In some cases, the wearable control device might concurrently link with and/or control both the first and second user devices, and might reconfigure the user interface of the wearable control device to provide, to the user, a third set of command options that are customized for controlling both the first user device and the second user device. The wearable control device might receive fourth user input comprising one or more of touch, gesture, and/or voice input. The wearable control device (and/or the remote computing system) might analyze the fourth user input to identify one or more second functionalities of a second plurality of functionalities of the second user device to invoke, and might generate second command instructions. The wearable control device might send the generated second command instructions to the second user device, via the wireless communications.

In some embodiments, the wearable control device might have a form comprising one of a bracer, a bracelet, a wrist watch, a smart watch, a wrist band, a bangle, a gauntlet, a wrist strap, a finger ring, a head band, or a glove, and/or the like. In some cases, the wearable control device might include, without limitation, at least one of a wrist strap, a clip, a pin, a clasp, an ear-loop, a finger ring, a toe ring, a bangle, a hook and loop-type strap, eyewear stems, a head band, or a buckle, and/or the like, that allows the wearable control device to be removably affixed to at least one of a wrist of the user, a portion of skin of the user, a limb of the user, an appendage of the user, a torso of the user, a head of the user, or a piece of clothing worn by the user, and/or the like.

According to some embodiments, the one or more input/output ("I/O") devices that track or receive the first and second user inputs might include, without limitation, at least one of one or more gesture input devices, one or more voice input devices, or one or more touch input devices, and/or the like. The one or more gesture input devices, in some cases, might include, without limitation, at least one of one or more accelerometers, one or more gyroscopes, one or more motion sensors, one or more location sensors, one or more altitude sensors, one or more tilt sensors, or one or more rotation sensors, and/or the like. The one or more voice input devices, in some instances, might include, but are not limited to, at least one of one or more microphones, one or more sound amplitude detectors, one or more sound frequency detectors, or one or more voice recognition devices, and/or the like. The one or more touch input devices, in some embodiments, might include, without limitation, at least one of a pointer stick (or finger-controlled joystick), one or more touchscreen displays, one or more buttons, one or more switches, one or more toggles, or one or more dials, and/or the like.

Merely by way of example, in some embodiments, the plurality of user devices might include, but are not limited to, at least one of one or more display devices, one or more speakers, one or more media recording or playback devices, one or more household appliances, one or more kitchen appliances, one or more lighting systems, one or more automated door locking systems, one or more automated door opening or closing systems, one or more automated window locking systems, one or more automated window opening or closing systems, one or more smart windows, one or more window covering control systems, one or more customer premises security systems, one or more customer premises environmental control systems, one or more electrical outlets, one or more power strips, one or more dimmer switches, one or more data ports, one or more clocks, one or more sprinkler systems, one or more vehicles, one or more mobile user devices, one or more medical devices, one or more fitness trackers, or one or more exercise equipment, and/or the like.

Various uses or implementations may be made to the various embodiments and examples without departing from the scope of the invention. For example, while the embodiments described above refer to particular features or particular uses, the scope of this invention also includes embodiments having different combination of features or uses, and the embodiments that do not include all of the above described features.

The various embodiments of the wearable control device and associated system, in some embodiments, performs one or more of the following: delivers practical IoT functionality, provides a customizable lifestyle experience for users, provides a platform for service providers to integrate new business strategies (e.g., in the form of product functionality releases or service releases) without necessarily replacing hardware, reduces usage complexity for the users (particular those users who may be overwhelmed by technology), combines multiple devices (or multiple device controls) into a single solution (while also combining two or more of voice control, gesture control, touch control, IoT functionalities, gateway functionalities, and/or WiFi or other wireless mesh, etc.), infuses ever more integration between or amongst devices (while providing simple out-of-the-box experience for the users), extends customer functionality via the service provider network (and also leveraging other networks for richer experience for the users), deploying cloud and analytics services to single family unit ("SFU") as well as small-to-medium sized business or enterprise ("SMB" or "SME") markets for fully integrated experience, and/or the like.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network virtualization technology, network configuration technology, virtualized network function technology, Internet of Things ("IoT") technology, machine-to-machine communication, remote control technologies, gesture control technologies, and/or the like. In other aspects, certain embodiments, can improve the functioning of user equipment or systems themselves (e.g., IoT device networks, IoT devices, IoT systems, human interface devices, remote control devices, etc.), for example, by analyzing first user input comprising one or a combination of two or more of touch, gesture, and/or voice input from a user, to identify each of one or more user devices of a plurality of user devices to remotely control; establish wireless communications based on such identification of user device(s); reconfigure a user interface of a wearable control device to provide command options for control one or a combination of two or more of the user devices of the plurality of user devices; analyzing second user input comprising one or a combination of two or more of touch, gesture, and/or voice input from the user, to identify one or more functionalities of a plurality of functionalities for each of the identified or connected/linked user devices; generating and sending command instructions to the identified or connected/linked user devices, based at least in part on the one or more functionalities, and/or the like. In particular, to the extent any abstract concepts are present in the various embodiments, those concepts can be implemented as described herein by devices, software, systems, and methods that involve specific novel functionality (e.g., steps or operations), such as analyzing first user input comprising one or a combination of two or more of touch, gesture, and/or voice input from a user, to identify each of one or more user devices of a plurality of user devices to remotely control; establish wireless communications based on such identification of user device(s); reconfigure a user interface of a wearable control device to provide command options for control one or a combination of two or more of the user devices of the plurality of user devices; analyzing second user input comprising one or a combination of two or more of touch, gesture, and/or voice input from the user, to identify one or more functionalities of a plurality of functionalities for each of the identified or connected/linked user devices; generating and sending command instructions to the identified or connected/linked user devices, based at least in part on the one or more functionalities, and/or the like, which improves the interaction between the user and the wearable control device, and improves the interaction between the wearable control device and the various user devices (which might include IoT devices) in the area (i.e., around the user), improves the functionality of the wearable control device, improves the functionality of the network of IoT or other user devices, and/or the like, to name a few examples, that extend beyond mere conventional computer processing operations. These functionalities can produce tangible results outside of the implementing computer system, including, merely by way of example, improved functionality of the remote control device (in this case, a wearable control device), improved customer experience with IoT or other user devices and with the remote control device (in this case, a wearable control device), improved lifestyle experience of the user with respect to connected devices in the user's life particularly, and/or the like, at least some of which may be observed or measured by customers and/or service providers.

In an aspect, a method might comprise receiving, with a wearable control device worn by a user, at least one first user input indicating which user device of a plurality of user devices that the user intends to control, the at least one first user input comprising at least one of first gesture input, first voice input, or first touch input. The method might also comprise identifying, with at least one of the wearable control device or a remote computing system, a first user device of the plurality of user devices to remotely control based at least in part on the received at least one first user input; establishing, with the wearable control device, wireless communication with the identified first user device; and reconfiguring, with the wearable control device, a user interface of the wearable control device to provide, to the user, a first set of command options that are customized for controlling the first user device. The method might also comprise receiving, with the wearable control device, at least one second user input indicating which functionalities of a first plurality of functionalities of the first user device the user intends to invoke, the at least one second user input comprising at least one of second gesture input, second voice input, or second touch input; and identifying, with the at least one of the wearable control device or the remote computing system, one or more first functionalities of the first plurality of functionalities of the first user device to invoke based at least in part on the received at least one second user input. The method might further comprise generating, with the at least one of the wearable control device or the remote computing system, one or more first command instructions for the first user device, based at least in part on the identified one or more first functionalities of the first user device; and sending, with the wearable control device and via the wireless communication with the first user device, the generated one or more first command instructions to cause the first user device to perform the one or more first functionalities.

Merely by way of example, in some embodiments, the wearable control device has a form comprising one of a bracer, a bracelet, a wrist watch, a smart watch, a wrist band, a bangle, a gauntlet, a wrist strap, a finger ring, a head band, or a glove, and/or the like. According to some embodiments, the plurality of user devices might comprise at least one of one or more display devices, one or more speakers, one or more media recording or playback devices, one or more household appliances, one or more kitchen appliances, one or more lighting systems, one or more automated door locking systems, one or more automated door opening or closing systems, one or more automated window locking systems, one or more automated window opening or closing systems, one or more smart windows, one or more window covering control systems, one or more customer premises security systems, one or more customer premises environmental control systems, one or more electrical outlets, one or more power strips, one or more dimmer switches, one or more data ports, one or more clocks, one or more sprinkler systems, one or more vehicles, one or more mobile user devices, one or more medical devices, one or more fitness trackers, or one or more exercise equipment, and/or the like.

In some instances, the wireless communication might comprise at least one of machine-to-machine Internet of Things ("IoT") communications, Bluetooth communications, Z-wave communications, ZigBee communications, or WiFi communications, and/or the like. In some cases, establishing wireless communication with the identified first user device might comprise establishing, with the wearable control device, wireless communication with the identified first user device via one or more application programming interfaces ("APIs") established between the wearable control device and the first user device.

According to some embodiments, identifying the first user device might comprise analyzing, with the at least one of the wearable control device or the remote computing system, the at least one first user input by using at least one of the first gesture input, the first voice input, or the first touch input to augment or complement at least one other of the first gesture input, the first voice input, or the first touch input. Similarly, identifying the one or more first functionalities of the first user device might comprise analyzing, with the at least one of the wearable control device or the remote computing system, the at least one second user input by using at least one of the second gesture input, the second voice input, or the second touch input to augment or complement at least one other of the second gesture input, the second voice input, or the second touch input.

Alternatively, or additionally, identifying the first user device and identifying the one or more first functionalities of the first user device might comprise analyzing, with the at least one of the wearable control device or the remote computing system, the at least one first user input and the at least one second user input, respectively, using artificial intelligence ("AI") to improve interactions with the user. In some instances, the AI might be further utilized to improve machine-to-machine interactions and to improve reconfiguration of the user interface of the wearable control device to provide, to the user, the command options that are customized for controlling the first user device. In some cases, the remote computing system might comprise at least one of a server computer remote from the wearable control device, a gateway device, a human interface device, a cloud computing system, or a distributed computing system that integrates computing resources from two or more user devices of the plurality of user devices, and/or the like.

In some embodiments, the method might further comprise receiving, with the wearable control device, at least one third user input indicating which other user device of the plurality of user devices that the user intends to control next, the at least one third user input comprising at least one of third gesture input, third voice input, or third touch input; and identifying, with the at least one of the wearable control device or the remote computing system, a second user device of the plurality of user devices to remotely control based at least in part on the received at least one third user input. The method might also comprise establishing, with the wearable control device, wireless communication with the identified second user device; and reconfiguring, with the wearable control device, the user interface of the wearable control device to provide, to the user, a second set of command options that are customized for controlling the second user device, the second set of command options being different from the first set of command options. The method might additionally comprise receiving, with the wearable control device, at least one fourth user input indicating which functionalities of a second plurality of functionalities of the second user device to invoke, the at least one fourth user input comprising at least one of fourth gesture input, fourth voice input, or fourth touch input; and identifying, with the at least one of the wearable control device or the remote computing system, one or more second functionalities of the second plurality of functionalities of the second user device to invoke based at least in part on the received at least one fourth user input. The method might further comprise generating, with the at least one of the wearable control device or the remote computing system, one or more second command instructions for the second user device, based at least in part on the identified one or more second functionalities of the second user device; and sending, with the wearable control device and via the wireless communication with the second user device, the generated one or more second command instructions to cause the second user device to perform the one or more second functionalities.

Merely by way of example, according to some embodiments, the wearable control device might concurrently control both the first user device and the second user device, and reconfiguring the user interface might comprise reconfiguring, with the wearable control device, the user interface of the wearable control device to provide, to the user, a third set of command options, the third set of command options comprising a combination of the first set of command options that are customized for controlling the first user device and the second set of command options that are customized for controlling the second user device.

In another aspect, a wearable control device, which may be worn by a user, might comprise at least one processor, at least one user input device, a user interface, at least one transceiver, and a non-transitory computer readable medium communicatively coupled to the at least one processor. The non-transitory computer readable medium might have stored thereon computer software comprising a set of instructions that, when executed by the at least one processor, causes the wearable control device to: receive, via the at least one user input device, at least one first user input, the at least one first user input indicating which user device of a plurality of user devices that the user intends to control, the at least one first user input comprising at least one of first gesture input, first voice input, or first touch input; identify a first user device of the plurality of user devices to remotely control based at least in part on the received at least one first user input; establish, via the at least one transceiver, wireless communication with the identified first user device; reconfigure the user interface to provide, to the user, a first set of command options that are customized for controlling the first user device; receive, via the at least one user input device, at least one second user input, the at least one second user input indicating which functionalities of a first plurality of functionalities of the first user device the user intends to invoke, the at least one second user input comprising at least one of second gesture input, second voice input, or second touch input; identify one or more first functionalities of the first plurality of functionalities of the first user device to invoke based at least in part on the received at least one second user input; generate one or more first command instructions for the first user device, based at least in part on the identified one or more first functionalities of the first user device; and sending, via the at least one transceiver via the wireless communication with the first user device, the generated one or more first command instructions to cause the first user device to perform the one or more first functionalities.

Merely by way of example, in some embodiments, the wearable control device has a form comprising one of a bracer, a bracelet, a wrist watch, a smart watch, a wrist band, a bangle, a gauntlet, a wrist strap, a finger ring, a head band, or a glove, and/or the like. According to some embodiments, the plurality of user devices might comprise at least one of one or more display devices, one or more speakers, one or more media recording or playback devices, one or more household appliances, one or more kitchen appliances, one or more lighting systems, one or more automated door locking systems, one or more automated door opening or closing systems, one or more automated window locking systems, one or more automated window opening or closing systems, one or more smart windows, one or more window covering control systems, one or more customer premises security systems, one or more customer premises environmental control systems, one or more electrical outlets, one or more power strips, one or more dimmer switches, one or more data ports, one or more clocks, one or more sprinkler systems, one or more vehicles, one or more mobile user devices, one or more medical devices, one or more fitness trackers, or one or more exercise equipment, and/or the like.

In some instances, the at least one transceiver might be configured to provide wireless communications with one or more user devices of the plurality of user devices, the wireless communications comprising at least one of machine-to-machine Internet of Things ("IoT") communications, Bluetooth communications, Z-wave communications, ZigBee communications, or WiFi communications, and/or the like. In some cases, establishing wireless communication with the identified first user device might comprise establishing wireless communication with the identified first user device via one or more application programming interfaces ("APIs") established between the wearable control device and the first user device.

According to some embodiments, identifying the first user device might comprise analyzing the at least one first user input by using at least one of the first gesture input, the first voice input, or the first touch input to augment or complement at least one other of the first gesture input, the first voice input, or the first touch input. Similarly, identifying the one or more first functionalities of the first user device might comprise analyzing the at least one second user input by using at least one of the second gesture input, the second voice input, or the second touch input to augment or complement at least one other of the second gesture input, the second voice input, or the second touch input.

Alternatively, or additionally, identifying the first user device and identifying the one or more first functionalities of the first user device might comprise analyzing the at least one first user input and the at least one second user input, respectively, using artificial intelligence ("AI") to improve interactions with the user. In some instances, the AI might be further utilized to improve machine-to-machine interactions and to improve reconfiguration of the user interface of the wearable control device to provide, to the user, the command options that are customized for controlling the first user device. In some cases, identifying the first user device and identifying the one or more first functionalities of the first user device might comprise identifying, with at least one of the wearable control device or a remote computing system, the first user device and the one or more first functionalities of the first user device, respectively. In such cases, the remote computing system might comprise at least one of a server computer remote from the wearable control device, a gateway device, a human interface device, a cloud computing system, or a distributed computing system that integrates computing resources from two or more user devices of the plurality of user devices, and/or the like.

In some embodiments, the set of instructions, when executed by the at least one processor, further causes the wearable control device to: receive, via the at least one user input device, at least one third user input, the at least one third user input indicating which other user device of the plurality of user devices that the user intends to control next, the at least one third user input comprising at least one of third gesture input, third voice input, or third touch input; identify a second user device of the plurality of user devices to remotely control based at least in part on the received at least one third user input; establish, via the at least one transceiver, wireless communication with the identified second user device; reconfigure the user interface to provide, to the user, a second set of command options that are customized for controlling the second user device, the second set of command options being different from the first set of command options; receive, via the at least one user input device, at least one fourth user input, the at least one fourth user input indicating which functionalities of a second plurality of functionalities of the second user device to invoke, the at least one fourth user input comprising at least one of fourth gesture input, fourth voice input, or fourth touch input; identify one or more second functionalities of the second plurality of functionalities of the second user device to invoke based at least in part on the received at least one fourth user input; generate one or more second command instructions for the second user device, based at least in part on the identified one or more second functionalities of the second user device; and send, via the at least one transceiver via the wireless communication with the second user device, the generated one or more second command instructions to cause the second user device to perform the one or more second functionalities.

Merely by way of example, according to some embodiments, the wearable control device might concurrently control both the first user device and the second user device, and reconfiguring the user interface might comprise reconfiguring the user interface of the wearable control device to provide, to the user, a third set of command options, the third set of command options comprising a combination of the first set of command options that are customized for controlling the first user device and the second set of command options that are customized for controlling the second user device.

In some embodiments, the at least one user input device might comprise at least one of one or more gesture input devices, one or more voice input devices, or one or more touch input devices. The one or more gesture input devices might comprise one or more accelerometers, one or more gyroscopes, one or more motion sensors, one or more location sensors, one or more altitude sensors, one or more tilt sensors, or one or more rotation sensors, and/or the like. The one or more voice input devices might comprise one or more microphones, one or more sound amplitude detectors, one or more sound frequency detectors, or one or more voice recognition devices, wherein the one or more touch input devices comprise a pointer stick (or finger-controlled joystick), one or more touchscreen displays, one or more buttons, one or more switches, one or more toggles, or one or more dials, and/or the like. In some cases, receiving the at least one first user input might comprises receiving, via at least one of the one or more gesture input devices, the one or more voice input devices, or the one or more touch input devices, corresponding at least one of the first gesture input, the first voice input, or the first touch input. In some instances, receiving the at least one second user input might comprise receiving, via at least one of the one or more gesture input devices, the one or more voice input devices, or the one or more touch input devices, corresponding at least one of the second gesture input, the second voice input, or the second touch input.

According to some embodiments, wearable control device might further comprise at least one of a wrist strap, a clip, a pin, a clasp, an ear-loop, a finger ring, a toe ring, a bangle, a hook and loop-type strap, eyewear stems, a head band, or a buckle, and/or the like that allows the wearable control device to be removably affixed to at least one of a wrist of the user, a portion of skin of the user, a limb of the user, an appendage of the user, a torso of the user, a head of the user, or a piece of clothing worn by the user, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-8 illustrate some of the features of the method, system, and apparatus for implementing Internet of Things ("IoT") functionality, and, in particular embodiments, to methods, systems, apparatus, and computer software for implementing wearable control functionality, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

With reference to the figures, FIG. 1 is a schematic diagram illustrating a system 100 for implementing wearable control functionality, in accordance with various embodiments. In the non-limiting embodiment of FIG. 1, system 100 might include, without limitation, a wearable control device 105 that may be worn by a user 110, one or more input devices or input/output ("I/O") devices 115a-115n (collectively, "I/O devices 115" or "devices 115") that are disposed on or within the wearable control device 105, one or more user devices 120a-120n (collectively, "user devices 120" or "devices 120"), and one or more IoT-capable sensors 125a-125n (collectively, "IoT-capable sensors 125," "IoT sensors 125," or "sensors 125"), and/or the like.

In some instances, the wearable control device 105 might have a form comprising one of a bracer, a bracelet, a wrist watch, a smart watch, a wrist band, a bangle, a gauntlet, a wrist strap, a finger ring, a head band, or a glove, and/or the like. In some cases, the wearable control device 105 might include, without limitation, at least one of a wrist strap, a clip, a pin, a clasp, an ear-loop, a finger ring, a toe ring, a bangle, a hook and loop-type strap, eyewear stems, a head band, or a buckle, and/or the like, that allows the wearable control device 105 to be removably affixed to at least one of a wrist of the user 110, a portion of skin of the user 110, a limb of the user 110, an appendage of the user 110, a torso of the user 110, a head of the user 110, or a piece of clothing worn by the user 110, and/or the like.

According to some embodiments, the one or more I/O devices 115 might include, without limitation, at least one of one or more gesture input devices, one or more voice input devices, or one or more touch input devices, and/or the like.

The one or more gesture input devices, in some cases, might include, without limitation, at least one of one or more accelerometers, one or more gyroscopes, one or more motion sensors, one or more location sensors, one or more altitude sensors, one or more tilt sensors, or one or more rotation sensors, and/or the like. The one or more voice input devices, in some instances, might include, but are not limited to, at least one of one or more microphones, one or more sound amplitude detectors, one or more sound frequency detectors, or one or more voice recognition devices, and/or the like. The one or more touch input devices, in some embodiments, might include, without limitation, at least one of a pointer stick (or finger-controlled joystick), one or more touchscreen displays, one or more buttons, one or more switches, one or more toggles, or one or more dials, and/or the like.

In some embodiments, the one or more user devices 120 might include, but are not limited to, at least one of one or more display devices, one or more speakers, one or more media recording or playback devices, one or more household appliances, one or more kitchen appliances, one or more lighting systems, one or more automated door locking systems, one or more automated door opening or closing systems, one or more automated window locking systems, one or more automated window opening or closing systems, one or more smart windows, one or more window covering control systems, one or more customer premises security systems, one or more customer premises environmental control systems, one or more electrical outlets, one or more power strips, one or more dimmer switches, one or more data ports, one or more clocks, one or more sprinkler systems, one or more vehicles, one or more mobile user devices, one or more medical devices, one or more fitness trackers, or one or more exercise equipment, and/or the like.

In some instances, the one or more IoT-capable sensors 125 might include, without limitation, at least one of an ambient temperature sensor, a flame detector, a particulate sensor, a light sensor, a humidity sensor, an air quality sensor, an atmospheric oxygen level monitor, an atmospheric carbon dioxide level monitor, an atmospheric nitrogen level monitor, an atmospheric pressure sensor, an environmental carbon monoxide sensor, a smoke detector, a gas toxicity monitor, a carcinogen detector, a radiation sensor, a location sensor, a location beacon, an object identifier beacon, a telecommunications signal sensor, a sound amplitude sensor, a frequency sensor, one or more accelerometers, one or more proximity sensors, a weather sensor, or a seismic sensor, and/or the like. According to some embodiments, rather than a sensor that senses location or other information, and the like, beacons (e.g., location beacons, object identifier beacons, and/or the like) might be used to announce (broadcast or otherwise send) information regarding a specific location, item/object, and/or the like. The wearable control device 105 can then respond to the information sent by the beacon and take the appropriate actions.

According to some embodiments, system 100 might further comprise a computing system 130 that may be communicatively coupled to at least the wearable control device 105 (and in some cases, one or more of the devices 120 or one or more of the sensors 125) via network 135 (and in some instances, via one or more telecommunications relay systems 140). In some embodiments, the wearable control device 105 might communicate with the remote computing system 130 that handles, coordinates, and/or manages IoT or other machine communications and interactions amongst a plurality of IoT or other devices (and in some instances, all IoT or other devices) that are communicatively coupled to the service provider network that is associated with the computing system 130 and/or to any network with which the remote computing system 130 is in communication. In some cases, the computing system 130 might include, but is not limited to, at least one of a server computer remote from the wearable control device, a gateway device, a human interface device, a cloud computing system, or a distributed computing system that integrates computing resources from two or more user devices of the plurality of user devices, and/or the like. In some instances, the network 135 might include, without limitation, one of a fiber network, an Ethernet network, a Token-Ring™ network, a wide-area network ("WAN"), a wireless wide area network ("WWAN"), a virtual private network ("VPN"), the Internet, an intranet, an extranet, a public switched telephone network ("PSTN"), an infra-red network, a wireless network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol, and/or any combination of these and/or other networks. In a particular embodiment, the network 135 might include an access network of the service provider (e.g., an Internet service provider ("ISP")), or the like. The one or more telecommunications relay systems 140 might include, without limitation, one or more wireless network interfaces (e.g., wireless modems, wireless access points, and the like), one or more towers, one or more satellites, and/or the like. According to some embodiments, one or more of the wearable control device 105, user devices 120, and/or the IoT-capable sensors 125 might each comprise a software-defined multiple radio device or other multiple radio device (e.g., multiple radio devices that comprise multiple physical layer chipsets or the like) that allows each of these devices to simultaneously operate in several standards and frequencies, including, but not limited to, Wi-Fi, LTE, IoT standards (like 6LowPAN, LoRa, etc.). In this manner, these devices might each serve as an access point, small cell, and IoT base, simultaneously, with the same RF transmit stage. The multiple radio device functionality and implementation are described in detail in the '7086 and '878 applications, which have already been incorporated herein by reference in their entirety.

In some embodiments, the system 100 might further comprise a data store or data lake 145 that stores information regarding the wearable control device 105, information regarding the user devices 120, information regarding the IoT-capable sensors 125, information regarding communications amongst these devices and sensors, information regarding data exchanged between the user 110 and the wearable control device 105, information regarding the network, information regarding communications between the computing system 130 and each of the wearable control device 105, the user devices 120, and the IoT-capable sensors 125, and/or the like. Any sensitive information, such as personal information about the user or other sensitive data might be encrypted prior to any communications with other devices, and in some cases may be encrypted prior to storing on the local data stores of the devices. In some embodiments, quantum security methods may be utilized to protect data and user privacy.

In some cases, the system 100 might further comprise an analytics engine 150 and an associated database 155 that together analyze and track (or record) non-sensitive communications amongst the various components of system 100 (i.e., the wearable control device 105, the user 110, the user devices 120, the IoT-capable sensors 125, the computing system 130, and/or the like) to identify trends as well as to identify potential issues with communications or efficiency of the system, and/or the like, the results of which might cause the computing system 130 to send software updates to affected or applicable ones of the wearable control device 105, the user devices 120, the IoT-capable sensors 125, and/or the like). In some embodiments, the database 155 might also contain profiles regarding how the wearable control device is to respond (or how IoT-capable sensors are to respond) under certain conditions communicated to the analytics engine 150 from the user devices 120, the IoT sensors 125, and/or the wearable control device 105.

The machine-to-machine communications between the wearable control device 105 and each of the user devices 120a-120n, between the wearable control device 105 and each of the IoT-capable sensors 125a-125n are represented in FIG. 1 by the lightning bolt symbols, which in some cases denotes wireless communications (although, in some instances, need not be wireless, but can be wired communications). In some instances, each IoT-capable sensor of the plurality of IoT-capable sensors 125a-125n and each user device of the plurality of user devices 120a-120n, as well as the wearable control device 105) might be assigned a unique IPv6 identifier or the like that enables secure and non-confused communications with particular IoT-capable sensors or sensors (as no two devices or sensors will have the same identifier). In some cases, the IPv6 identifiers may be used together with other identifiers for the same device. In some instances, such identification capability can simplify device registration and/or can be used to facilitate machine-to-machine communications, machine-to-network communications, and/or the like.

According to some embodiments, one or more application programming interfaces ("APIs") might be established between the wearable control device 105 and each of the user devices 120a-120n, and between the wearable control device 105 and each of the IoT-capable sensors 125a-125n. The APIs facilitate communications with these user devices and these IoT-capable sensors, which could number in the thousands or more. In some embodiments, artificial intelligence ("AI") may be utilized in the wearable control device to improve interactions with the user, as well as improving machine-to-machine interactions between the wearable control device 105 and each of the user devices 120a-120n, and between the wearable control device 105 and each of the IoT-capable sensors 125a-125n, and to improve utilization of the user devices 120 and the plurality of IoT-capable sensors 125, and/or the like.

In some embodiments, the wearable control device 105 might include, without limitation, at least one of a voice interface device (including one or more speakers and one or more microphones; in some cases with voice and language recognition; perhaps assisted by any AI functionality that is present in the device or the like), a button/switch/dial/toggle/pointer stick/etc. interface, a gesture control interface (where one or more sets of accelerometers, gyroscopes, location sensors (that senses or determines location based on the sensor readings), a location beacon (that sends location information to other devices, in some cases, in a broadcast, in a unicast, or in a directed transmission manner, or the like), and/or the like to record particular motions or gestures that can be designated as command gestures; etc.), a touch-screen user interface, a display interface, a haptic feedback interface, a wireless communications interface (that can communicate with one or more user devices associated with the user), and/or the like. In other words, through one or more of voice interactions, physical interactions, gesture interactions, and/or user device interactions, or the like, the user can communicate with and interact with the wearable control device 105 to provide information to the wearable control device, to provide commands to the wearable control device for controlling the one or more user devices, to receive sensor data or analyses of sensor data, to receive alerts, to receive feedback or suggestions, and/or the like.

In operation, the wearable control device 105 (when worn by the user 110) might receive at least one first user input indicating which user device of a plurality of user devices 120 that the user intends to control. The at least one first user input might comprise at least one of first gesture input, first voice input, or first touch input, and/or the like. The wearable control device 105 and/or the computing system 130 might identify a first user device 120 of the plurality of user devices to remotely control based at least in part on the received at least one first user input. The wearable device 105 might establish wireless communication with the identified first user device 120, and might reconfigure a user interface of the wearable control device 105 to provide, to the user 110, a first set of command options that are customized for controlling the first user device 120. The wearable control device 105 might subsequently receive at least one second user input indicating which functionalities of a first plurality of functionalities of the first user device the user intends to invoke. The at least one second user input might comprise at least one of second gesture input, second voice input, or second touch input, and/or the like. The wearable control device 105 and/or the computing system 130 might identify one or more first functionalities of the first plurality of functionalities of the first user device to invoke based at least in part on the received at least one second user input, and might generate one or more first command instructions for the first user device 120, based at least in part on the identified one or more first functionalities of the first user device. The wearable control device might subsequently send the generated one or more first command instructions to cause the first user device 120 to perform the one or more first functionalities.

In some embodiments, the wearable control device 105 (when worn by the user 110) might further receive at least one third user input indicating which other user device of the plurality of user devices 120 that the user intends to control. The at least one third user input might comprise at least one of third gesture input, third voice input, or third touch input, and/or the like. The wearable control device 105 and/or the computing system 130 might identify a second user device 120 of the plurality of user devices to remotely control based at least in part on the received at least one third user input. The wearable device 105 might establish wireless communication with the identified second user device 120, and might reconfigure the user interface of the wearable control device 105 to provide, to the user 110, a second set of command options that are customized for controlling the second user device 120. In some cases, the wearable control device 105 might concurrently link with and/or control both the first and second user devices, and might reconfigure the user interface of the wearable control device 105 to provide, to the user 110, a third set of command options that are customized for controlling both the first user device 120 and the second user device 120 (as shown, e.g., in the embodiment of FIG. 5C or the like). The wearable control device 105 might subsequently receive at least one fourth user input indicating which functionalities of a second plurality of functionalities of the second user device the user intends to invoke. The at least one fourth user input might comprise at least one of fourth gesture input, fourth voice input, or fourth touch input, and/or the like. The wearable control device 105 and/or the computing system 130 might identify one or more second functionalities of the second plurality of functionalities of the second user device to invoke based at least in part on the received at least one fourth user input, and might generate one or more second command instructions for the second user device 120, based at least in part on the identified one or more second functionalities of the second user device. The wearable control device might subsequently send the generated one or more second command instructions to cause the second user device 120 to perform the one or more second functionalities.

In sum, the various embodiments provide a multifunction remote that makes use of one or more of touch screen functionalities, gesture/motion control functionalities, voice control functionalities, and/or other control functionalities, in a form that is wearable. Instead of using a mobile device across several software applications ("apps"), the wearable control device described herein might link the various apps (or might utilize a single user interface to control operations of the user devices that would otherwise by controlled via the various apps), based on the user device(s) the wearable control device is currently associated with, linked to, or connected to. In some cases, one or more of the touch, gesture, or voice control functionalities might supplement/complement or augment at least one other of the touch, gesture, or voice control functionalities. For example, gesture control might augment or complement voice control—that is, when using voice control to increase or decrease illumination of the lights, the user might say, "living room lights," while gesturing upward with his or her hand or finger(s) of the arm on which the wearable control device is worn (to increase illumination of the living room lights) or gesturing downward with his or her hand or finger(s) (to decrease illumination of the living room lights, up to the point of turning off the living room lights). Similarly, to select media content (e.g., video content, audio content, gaming content, image content, etc.) to be presented with, the user might say, "show me _____ content" (e.g., "show me Rogue Wars content" or "show me Master of the Rings content") and a list of such _____ content (e.g., Rogue Wars video, audio, image, or game; or Master of the Rings video, audio, image, or game) might be displayed, selectable by the user gesturing (or swiping) left, right, top, or down (with the finger or hand of the arm on which the wearable control device is worn) to control a cursor to move left, right, top, or down, respectively, or pointing with his or her finger or hand (of the arm on which the wearable control device is worn) to move the cursor in the direction of where the user is pointing or to move the cursor to a particular content within the list of content to which the user is pointing, and/or the like. The user might then say, "play," or might touch a play icon displayed on the user interface of the user device or wearable control device, to play the particular selected content. In general, however, with respect to cursor control and selection, the user might point with his or her finger or hand (of the arm on which the wearable control device is worn) to move the cursor in the direction of where the user is pointing or to move the cursor to highlight an item within the list of items (which could include a list of media content, a list of settings, a list of parameters, a list of options, and/or the like) to which the user is pointing, and/or the like, and the user might then say, "enter," "select," or "OK," or might touch a virtual or soft button displayed on the user interface of the user device or a physical button (or other physical actuator) on the user device wearable control device, to select the particular highlighted item. In this way, the wearable control device might act as an over-the-air wireless mouse or the like. The user might also use physical actuators on the wearable control device to select one of the listed media content, then either say, "play," or gesturing (with the finger or hand of the arm on which the wearable control device is worn) to play (e.g., by double clicking the air, closing the user's fist, wiggling one or more fingers, or the like). The user might zoom in or zoom out by saying, "zoom," and using the gesture control by, e.g., moving one or more fingers toward the thumb (of the arm on which the wearable control device is worn) or moving the one or more fingers away from the thumb (of the arm on which the wearable control device is worn), respectively. The user might rotate a view by saying, "rotate," while gesturing with two or more fingers and the thumb (of the arm on which the wearable control device is worn) or to rotate the forearm (of the arm on which the wearable control device is worn) in a clockwise or counter-clockwise direction to rotate the displayed view in the clockwise or counter-clockwise direction, respectively. The user might tilt or pan in a similar manner, by saying, "tilt" or "pan" or "change perspective," while gesturing his or her hand relative to his or her wrist (of the arm on which the wearable control device is worn) in the up/down direction or in the left/right direction (or to control the zoom as described above), or a combination of tilt, pan, and/or zoom, respectively. The user might write, draw, or paint by either selecting using the touch controls of the wearable device or the voice controls to write, draw, or paint (or to use a note pad/drawing pad/canvas, etc.), then gesturing with his or her finger(s) or hands (of the arm on which the wearable control device is worn) to write the words, draw some people/animal(s)/object(s), or paint some people/animal(s)/object(s), and/or the like. The user might play video games using the gesture control in combination with either the voice control and/or touch control, in a similar manner as one or more of these non-limiting examples.

Various other uses or implementations may be made to the various embodiments and examples without departing from the scope of the invention. For example, while the embodiments described above refer to particular features or particular uses, the scope of this invention also includes embodiments having different combination of features or uses, and the embodiments that do not include all of the above described features. In a sense, the wearable control device, which might be generally ring-shaped (in some cases), might be the one "ring" that rules them all (i.e., all or at least most user devices within wireless communications range), might be the one "ring" that finds them all (i.e., finds and connects with all or at least most user devices within wireless communications range), might be the one "ring" that gathers them all (i.e., gathers at least the functionalities of all or at least most user devices within wireless communications range in a single user interface or the like), and/or might be the one "ring" that in the darkness (or in the light) binds them (i.e., binds all or at least most user devices within wireless communications range into one integrated or connected user device environment or the like).

Figure 2:
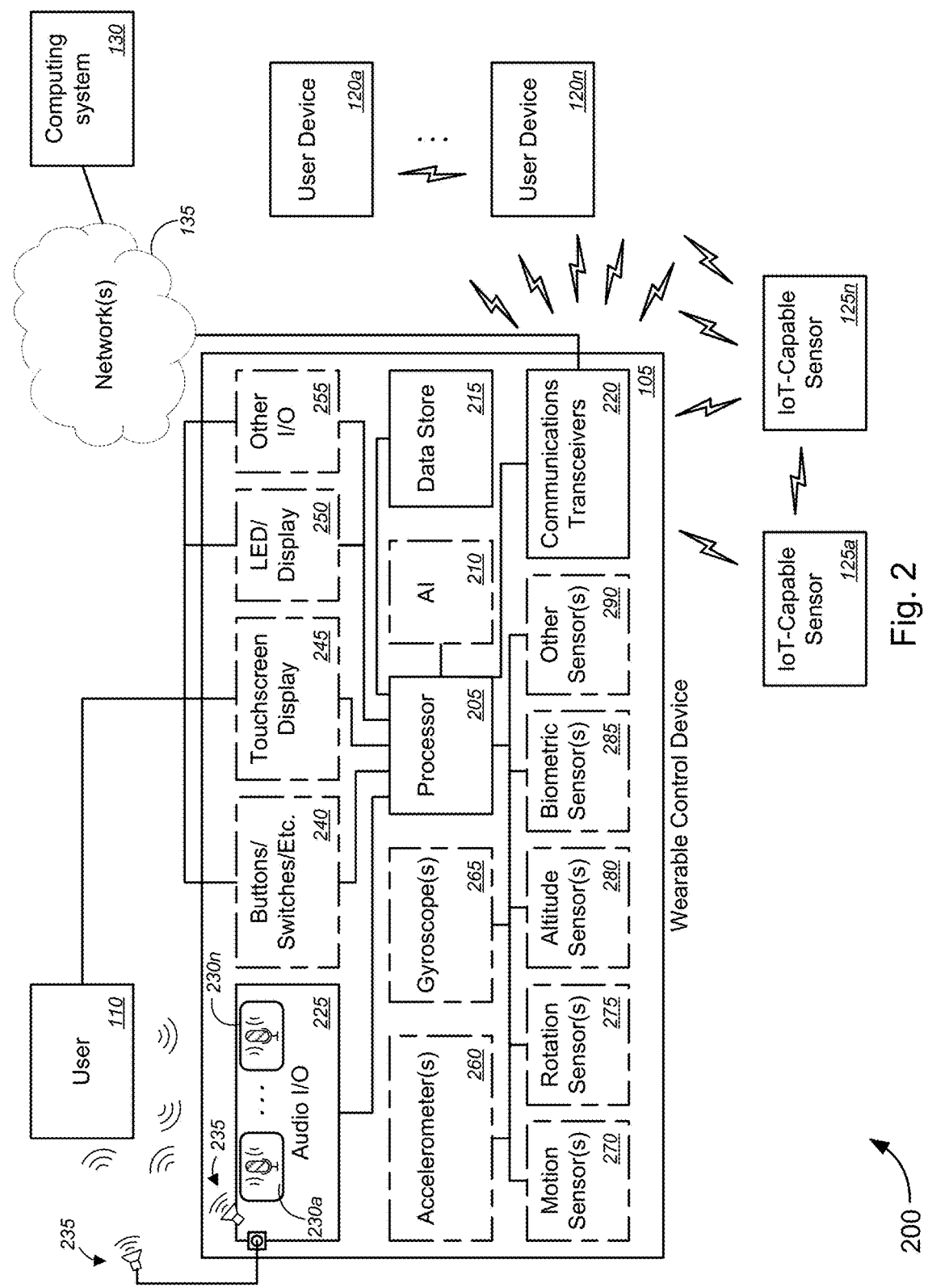
FIG. 2 is a schematic diagram illustrating another system for implementing wearable control functionality, in accordance with various embodiments.

FIG. 2 is a schematic diagram illustrating another system 200 for implementing wearable control functionality, in accordance with various embodiments. In the non-limiting embodiment of FIG. 2, according to some embodiments, system 200 might comprise a wearable control device 105 (which might correspond to wearable control device 105 of system 100 of FIG. 1, or the like) that might include, without limitation, one or more processors 205 (which in some cases might include an artificial intelligence ("AI") system or module 210 (optional)), one or more data stores or computer readable storage media 215, one or more communications transceivers 220, one or more audio input/output ("I/O") devices 225 (which might include, but are not limited to, at least one of one or more microphones or audio sensors 230a-230n (collectively, "microphones 230" or "audio sensors 230"), one or more speakers 235, one or more sound amplitude detectors (not shown), one or more sound frequency detectors (not shown), or one or more voice recognition devices (not shown), and/or the like), one or more buttons/switches/dials/toggles/pointer stick/etc. 240 (collectively, "buttons 240") (optional), one or more touchscreen display devices 245 (which in some cases might include flexible organic light emitting diode ("FoLED") displays or similar flexible displays, etc.) (optional), one or more LED/display devices 250 (optional), one or more other I/O devices 255 (optional), one or more accelerometers 260 (e.g., for fitness tracking, fall detection, gesture input, etc.) (optional), one or more gyroscopes 265 (e.g., for gesture input, etc.) (optional), one or more motion sensors 270 (e.g., for gesture input, etc.) (optional), one or more rotation sensors 275 (e.g., for gesture input, etc.) (optional), one or more altitude sensors 280 (e.g., for gesture input, etc.) (optional), one or more biometric sensors 285 (e.g., for authenticating the user 110 and/or commands issued by a person in control of the wearable control device 105, etc.) (optional), and one or more other sensors 290 (optional).

The one or more other I/O devices 255, in some cases, might include, without limitation, at least one of the following sets of components: a combination of one or more microphones, one or more speakers (which might be built-in speakers or external speakers connected through an audio jack or the like), one or more audio processors, and/or the like for voice interface functionality; one or more of at least one button, at least one touchscreen user interface, at least one display interface, and/or the like for touch interface functionality; one or more vibration, pressure, or force transducers and/or one or more pressure sensors that enable haptic feedback interface functionality; one or more wireless transceivers that communicate with one or more user devices associated with the user using any one or a combination of the wireless protocols described herein (including, but not limited to, 2.4 GHz or 5 GHz WiFi, Bluetooth, Z-wave, ZigBee, etc.) for wireless communication interface functionality; and/or the like. In some cases, the communications transceivers 220 might provide communications (either wired or wireless) between the wearable control device 105 and the computing system 130 via network(s) 135, might provide machine-to-machine communications (either wired or wireless) between the wearable control device 105 and each of the user devices 120, might provide machine-to-machine communications (either wired or wireless) between the wearable control device 105 and each of the IoT-capable sensors 125, and/or the like.

According to some embodiments, the one or more other sensors 290 might include, without limitation, one or more physical or physiological condition monitors, one or more temperature sensors (e.g., heat sensors, infrared sensors, thermometers, ambient temperature sensors, skin temperature sensors, etc.), one or more light sensors (e.g., ambient light sensors, luminosity sensors, illuminance sensors, solar light sensors, etc.), one or more pressure sensors (e.g., atmospheric pressure sensors, water pressure sensors (when underwater), etc.), one or more air quality sensors (e.g., CO sensors, toxic gas sensors, pollution sensors, etc.), one or more humidity sensors, one or more toxicity sensors (e.g., skin toxicity monitors, gas toxicity monitors, liquid toxicity monitors, poison detectors, carcinogen detectors, etc.), one or more location sensors (e.g., global positioning system ("GPS") devices, global navigation satellite system ("GNSS") devices, relative position sensors, other location sensors, etc.), a flame detector, a particulate sensor, an atmospheric oxygen level monitor, an atmospheric carbon dioxide level monitor, an atmospheric nitrogen level monitor, a smoke detector, a radiation sensor, a telecommunications signal sensor, one or more proximity sensors (e.g., for sensing proximity to user devices, to IoT-devices, to emergency response devices, to safe zone transponders, to other locations, etc.), a location beacon (that broadcasts or otherwise transmits location information of the object within which the beacon is disposed), an object identifier beacon (that broadcasts or otherwise transmits object identification or identifier information to requesting devices or the like), a weather sensor, or a seismic sensor, and/or the like.

In some embodiments, the user might speak with the wearable control device 105 to set particular modes, to provide information to the wearable control device 105, to provide commands to the wearable control device 105 to remotely control one or more user devices 120 (either concurrently or serially), to receive alerts as to the status of the user devices 120 and/or the communications connections with the user devices 120, and/or the like. Alternatively, or additionally, the user might interact with the wearable control device 105 via one or more of at least one button, at least one touchscreen user interface, at least one display interface to perform one or more of these functions. In another alternative or additional embodiment, the user might interact with the wearable control device 105 via haptic feedback interface, with one or more vibration, pressure, or force transducers providing haptic feedback to the user as a means of provide the user with the alerts, suggestions, notifications, and updates, while one or more pressure sensors might sense (and interpret) the user's response, commands, etc. In some embodiments, the user might use the wearable control device 105 to interact with one or more user devices 120 via other user devices (including, but not limited to, a tablet computer, a smart phone, a mobile phone, a personal digital assistant, a desktop computer, a television, a set-top box, a gaming console, a portable gaming device, a human interface device (such as the IoT human interface device as described in detail in the '764 and '710 applications, which have already been incorporated herein by reference in their entirety), and/or the like) that are associated with the user and that are in wireless communication with the wearable control device 105.

The wearable control device 105, the user 110, the user devices 120, the IoT-capable sensors 125, the computing system 130, and the network 135 of system 200 in FIG. 2 are otherwise similar, if not identical, to the wearable control device 105, the users 110, the user devices 120, the IoT-capable sensors 125, the computing system 130, and the network 135, respectively, of system 100 in FIG. 1, and the descriptions of these components of system 100 are applicable to the corresponding components of system 200, respectively.

Figure 3:
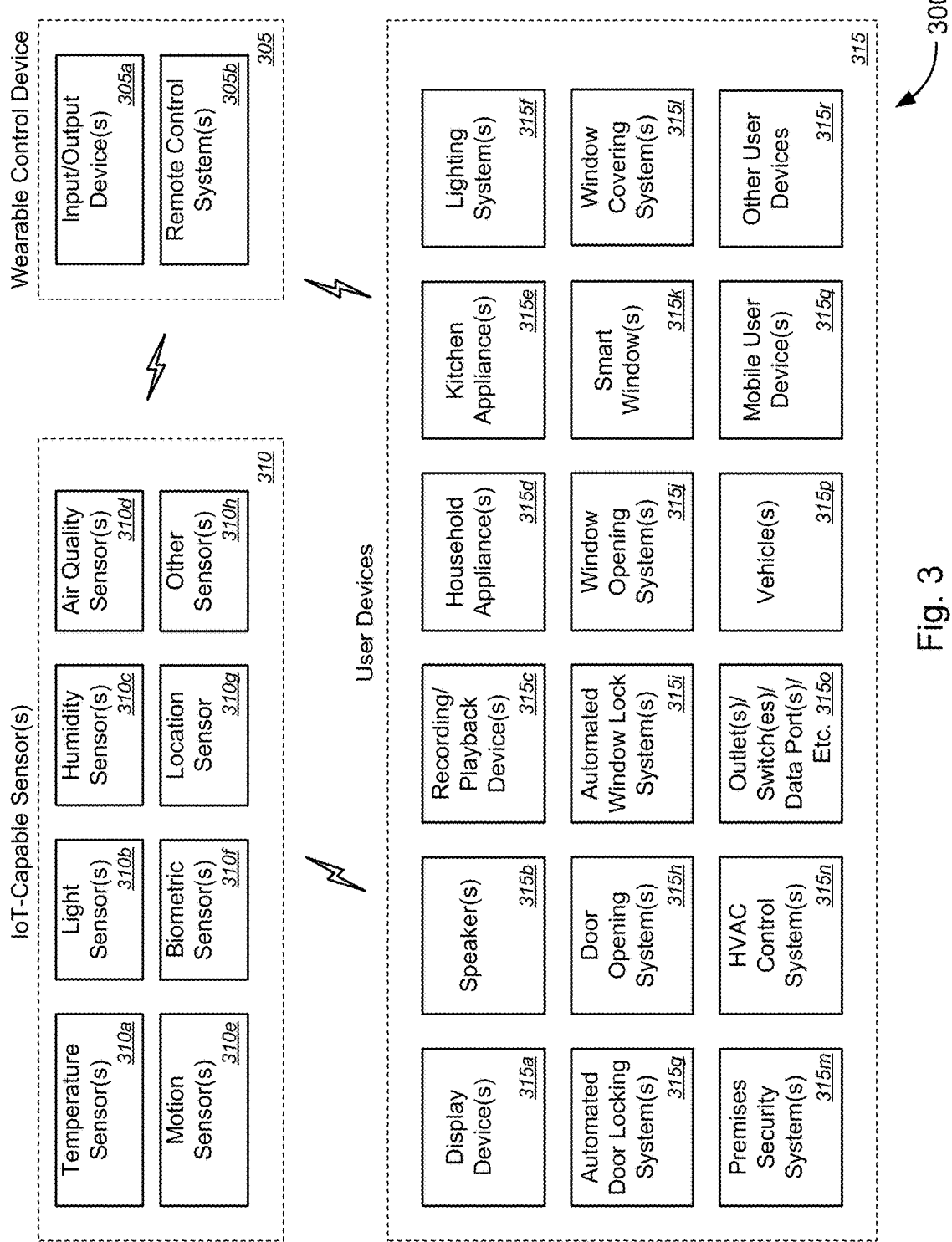
FIG. 3 is a schematic diagram illustrating yet another system for implementing wearable control functionality, in accordance with various embodiments.

FIG. 3 is a schematic diagram illustrating yet another system 300 for implementing wearable control functionality, in accordance with various embodiments. In particular, FIG. 3 depicts various examples of IoT-capable sensors 310 and various examples of user devices 315 with which the wearable control device 305 communicates. Some IoT-capable sensors 310, in some cases, also communicate with some user devices 315. Although lightning bolt symbols are used to denote wireless communications between two or more of the wearable control device 305, the IoT-capable sensors 310, and the user devices 315, the various embodiments are not so limited, and wired as well as wireless communications may be used. In any event, at least some communications would be autonomous machine-to-machine communications, while some communications would be user-initiated (or user-instructed) machine-to-machine communications. In some embodiments, multiple wearable control devices 305 may be implemented in place of, or complementary to, a single wearable control device 305 (not shown).

In some embodiments, the wearable control device 305 might include, but is not limited to, one or more input/output ("I/O") devices 305a and one or more remote control systems 305b, and/or the like. The one or more I/O devices 305a might include, without limitation, at least one of one or more gesture input devices, one or more voice input devices, or one or more touch input devices, and/or the like. The one or more gesture input devices, in some cases, might include, without limitation, at least one of one or more accelerometers, one or more gyroscopes, one or more motion sensors, one or more location sensors, one or more altitude sensors, one or more tilt sensors, or one or more rotation sensors, and/or the like. The one or more voice input devices, in some instances, might include, but are not limited to, at least one of one or more microphones, one or more sound amplitude detectors, one or more sound frequency detectors, or one or more voice recognition devices, and/or the like. The one or more touch input devices, in some embodiments, might include, without limitation, at least one of a pointer stick (or finger-controlled joystick), one or more touchscreen displays, one or more buttons, one or more switches, one or more toggles, or one or more dials, and/or the like. In some cases, the one or more remote control systems 305b might comprise communications transceivers (which might correspond to communications transceivers 220 of system 200 of FIG. 2, or the like), which might be configured to provide wireless communications with one or more user devices of the plurality of user devices, the wireless communications comprising at least one of machine-to-machine Internet of Things ("IoT") communications, Bluetooth communications, Z-wave communications, ZigBee communications, or WiFi communications, and/or the like. In some cases, the one or more remote control systems 305b might comprise one or more APIs established between the wearable control device 305 and each of at least one of the one or more user device 315, one or more APIs established between the wearable control device 305 and each of at least one of the one or more IoT-capable sensors 310, and/or the like.

According to some embodiments, the IoT-capable sensors 310 might include, without limitation, one or more temperature sensors 310a (e.g., heat sensors, infrared sensors, thermometers, etc.), one or more light sensors 310b (e.g., ambient light sensors, luminosity sensors, illuminance sensors, solar light sensors, etc.), one or more humidity sensors 310c, one or more air quality sensors 310d, one or more motion sensors 310e, one or more biometric sensors 310f (e.g., finger print sensor, retinal sensor, pupil sensor, palm print sensor, facial recognition sensor, voice recognition sensor, etc.), one or more location sensors 310g (e.g., global positioning system ("GPS") devices, global navigation satellite system ("GNSS") devices, other location sensors, etc.), one or more other sensors 310h, and/or the like. In some instances, the one or more other sensors 310h might include, but are not limited to, a flame detector, a particulate sensor, an atmospheric oxygen level monitor, an atmospheric carbon dioxide level monitor, an atmospheric nitrogen level monitor, an atmospheric pressure sensor, an environmental carbon monoxide sensor, a smoke detector, one or more toxicity sensors (e.g., gas toxicity, liquid toxicity, poison detectors, carcinogen detectors, etc.), a radiation sensor, a telecommunications signal sensor, a sound amplitude sensor, a frequency sensor, a location beacon, an object identifier beacon, a weather sensor, a wind sensor, or a seismic sensor, and/or the like.

In some embodiments, the user devices 315, some of which might include one or more IoT-capable sensors 310, might include, without limitation, one or more display devices 315a (including, but not limited to, one or more televisions, one or more monitors, one or more display screens, one or more projection displays, and/or the like), one or more speakers 315b, one or more media recording or playback devices 315c, one or more household appliances 315d (including, but not limited to, one or more automated vacuum machines, one or more automated mopping machines, one or more other cleaning drones, a clothes washing machine, a clothes dryer, and/or the like), one or more kitchen appliances 315e (including, but not limited to, a microwave oven, a refrigerator, an oven, a range, a stove, an induction cooktop, a pressure cooker, a rice cooker, a bread maker, a coffee machine, a kettle, a dishwasher, a food thermometer, and/or the like), one or more lighting systems 315f, one or more automated door locking systems 315g, one or more automated door opening or closing systems 315h (e.g., front door opening or closing system, patio door opening or closing system, side door opening or closing system, room door opening or closing system, garage door opening or closing system, etc.), one or more automated window locking systems 315i, one or more automated window opening or closing systems 315j, one or more smart windows 315k, one or more window covering control systems 315l, one or more customer premises security systems 315m, one or more customer premises environmental control systems 315n (e.g., thermostat, building HVAC control system, or the like), one or more electrical outlets/power strips/dimmer switches/data ports/etc. 315o, one or more vehicles 315p, one or more mobile user devices 315q, and/or one or more other user devices 315r. In some cases, the one or more other user devices 315r might include, without limitation, one or more clocks, one or more sprinkler systems, one or more medical devices, one or more fitness trackers, one or more exercise equipment, a solar cell or solar cell array, one or more dedicated remote control devices, one or more universal remote control devices, a telephone system, one or more other communications systems, a personal digital assistant, a desktop computer, a set-top box ("STB"), a gaming console, an image capture device, a video capture device, a printer, a scanner, an image projection device, a video projection device, one or more office devices, an audio headset, earbuds, virtual reality goggles or headset, augmented reality goggles or headset, an IoT management node, or an IoT human interface device (such as an IoT human interface device as described in detail in the '764 and '710 applications, which have already been incorporated herein by reference in their entirety), and/or the like. According to some embodiments, the mobile user device 315q might include, without limitation, at least one of a laptop computer, a tablet computer, a smart phone, a mobile phone, a portable gaming device, and/or the like.

The wearable control device 305, the IoT-capable sensors 310, and the user devices 315 are otherwise similar, if not identical, to the wearable control device 105, the user devices 120, and IoT-capable sensors 125, respectively, as described above with respect to FIGS. 1 and 2, and the descriptions of these components of system 300 are applicable to the corresponding components of system 100 or 200, respectively.

FIGS. 4A and 4B (collectively, "FIG. 4") are schematic diagrams illustrating various views of an exemplary embodiment of a wearable control device 400, in accordance with various embodiments. FIG. 4A depicts a front plan view of an exemplary embodiment of a wearable control device 400 (which is illustrated as a bangle, a bracelet, or bracer, or the like). FIG. 4B depicts a side view of the wearable control device 400 as shown along the A-A direction as indicated in FIG. 4A. Although the wearable control device 400 is shown as taking the form of a bangle, a bracelet, or bracer, or the like, the various embodiments are not so limited, and the wearable control device 400 may take on any suitable form or shape, including, but not limited to, a wrist watch, a smart watch, a wrist band, a gauntlet, a wrist strap, a finger ring, a head band, or a glove, and/or the like.

In the non-limiting embodiment of FIG. 4A, the wearable control device 400 might comprise a housing 405 (which, in this case, is in the form of a band or wrist band, or the like), a first segment 410a, a second segment 410b, a third segment 410c, and a pair of metal side bands 415 (which, in this case, is formed on either side of the housing 405 (i.e., the band or wrist band) to provide structural support or strength, etc.), and/or the like. The first segment 410a, according to some embodiments, might house at one processor, which might be mounted on circuit board 420 on which is also mounted other electronics and circuitry for the wearable control device 400. In some instances, the circuit board might comprise a flexible circuit board (or printable circuit board) that is configured to flex when the housing 405 (in this case, the band or wrist band, etc.) is flexed when worn or used by the user. The second segment 410b, in some embodiments, might house a display device 425 (which might correspond to the one or more touchscreen display devices 245 or the one or more LED/display devices 250 of system 200 of FIG. 2, or the like), which, in some cases, might be a touchscreen display and, in other cases, might be a flexible touchscreen display (e.g., a flexible organic light emitting diode ("FoLED") display or the like). The third segment 410c, in some instances, might house one or more user selection devices 430, including, but not limited to, at least one of one or more physical actuators (e.g., physical buttons, switches, dials, toggles, a pointer stick, and/or the like; which might correspond to the one or more buttons/switches/dials/toggles/pointer stick/etc. 240 of system 200 of FIG. 2, or the like), one or more touchscreen display inputs (e.g., virtual or soft buttons, switches, dials, toggles, pointer stick, and/or the like), and/or the like for providing the user with options to select a mode of the wearable control device (e.g., to change from a remote controller mode to a gesture control mode, and vice versa, to change from/to a watch (or time piece) mode, to change from/to a voice input mode, to select a programming mode (to program quick keys, keywords, sets of commands for controlling multiple devices (as well as the sequences and parameters for each task by each device), sets of commands for controlling a single device to perform multiple tasks (as well as the sequences and parameters for each task by each device), sets of commands to control each of multiple devices to perform multiple tasks (as well as the sequences and parameters for each task by each device)), to select a volume for output by the wearable control device (or by a user device(s) being controlled), to select mute mode for the wearable control device (or by a user device(s) being controlled), to select an option in a top-down list, in a side-toside list, or in another two-dimensionally displayed list that is displayed on a display device (e.g., touchscreen display 425) of the wearable control device 400 and/or displayed on a display device on each of one or more of the user devices being remotely controlled by the wearable control device 400, and/or the like.

With reference to FIG. 4B, the wearable control device 400 (at least in the non-limiting embodiment of FIG. 4) might further comprise a fourth segment 410d, a fifth segment 410e, and a sixth segment 410f, and/or the like. In some cases, the fourth segment 410d, might house one or more communications systems 435 (which might correspond to communications transceivers 220 of system 200 of FIG. 2, or the like), including, without limitation, at least one of one or more Bluetooth™ antennas, one or more Z-Wave antennas, one or more ZigBee antennas, one or more Wi-Fi antennas, one or more communications signal sensors (e.g., radio sensors, etc.; which might correspond to the telecommunications signal sensor as described with respect to the other sensors 290 of system 200 of FIG. 2 or the like), and/or the like.

The fifth segment 410e, in some embodiments, might house one or more other sensors or other hardware 440, including, but not limited to, one or more of one or more microphones or audio sensors (which might correspond to the one or more microphones or audio sensors 230a-230n of system 200 of FIG. 2 or the like), one or more speakers (which might correspond to speakers 235 of system 200 of FIG. 2 or the like), one or more sound amplitude detectors (not shown), one or more sound frequency detectors (not shown), or one or more voice recognition devices (not shown), one or more accelerometers (which might correspond to the one or more accelerometers 260 of system 200 of FIG. 2 or the like), one or more gyroscopes (which might correspond to the one or more gyroscopes 265 of system 200 of FIG. 2 or the like), one or more motion sensors (which might correspond to the one or more motion sensors 270 of system 200 of FIG. 2 or the like), one or more rotation sensors (which might correspond to the one or more rotation sensors 275 of system 200 of FIG. 2 or the like), one or more altitude sensors (which might correspond to the one or more altitude sensors 280 of system 200 of FIG. 2 or the like), one or more biometric sensors (which might correspond to the one or more biometric sensors 285 of system 200 of FIG. 2 or the like), and/or one or more other sensors or hardware, and/or the like. The one or more other sensors or hardware, in some cases, might include, without limitation, one or more physical or physiological condition monitors, one or more temperature sensors, one or more light sensors, one or more pressure sensors, one or more air quality sensors, one or more humidity sensors, one or more toxicity sensors, one or more location sensors, a flame detector, a particulate sensor, an atmospheric oxygen level monitor, an atmospheric carbon dioxide level monitor, an atmospheric nitrogen level monitor, a smoke detector, a radiation sensor, one or more proximity sensors, a location beacon, an object identifier beacon, a weather sensor, or a seismic sensor, and/or the like (which might correspond to the one or more physical or physiological condition monitors, the one or more temperature sensors, the one or more light sensors, the one or more pressure sensors, the one or more air quality sensors, the one or more humidity sensors, the one or more toxicity sensors, the one or more location sensors, the flame detector, the particulate sensor, the atmospheric oxygen level monitor, the atmospheric carbon dioxide level monitor, the atmospheric nitrogen level monitor, the smoke detector, the radiation sensor, the one or more proximity sensors, the location beacon, the object identifier beacon, the weather sensor, or the seismic sensor, as described with respect to the other sensors 290 of system 200 of FIG. 2 or the like).

The sixth segment 410f, according to some embodiments, might house one or more batteries 445, which might be removable or non-removable, and which might have contact charging points that are exposed along the housing 405 that mate with corresponding contact charging points on an external battery charging device or might have a built-in wireless charging system (which, in some cases, might utilize inductive charging techniques or the like).

Merely by way of example, in some embodiments, the wearable control device might further comprise one or more flex points 450 (depicted in FIG. 4B by double dashed lines that diverge radially outward from the generally circular or ovoid form of the bangle/bracelet/bracer form of the embodiment of the wearable control device 400 of FIG. 4) that allow the housing 405 of the wearable control device 400 to flex to allow the user to removably wear the wearable control device 400. For example, with the bangle/bracelet/bracer form of the wearable control device 400, as shown, e.g., in FIG. 4, the flex points 450 allow the band or wrist band 405 to flex so that the user can fit his or her wrist between the rubber tips 455 of the band or wrist band 405. In some cases, the one or more flex points 450 might be disposed between adjacent pairs of each of the one or more segments 410a-410f (i.e., between the sixth and first segments 410f and 410a, respectively, between the first and second segments 410a and 410b, respectively, between the second and third segments 410b and 410c, respectively, between the third and fourth segments 410c and 410d, respectively, and between the fourth and fifth segments 410d and 410e, respectively), while, in other cases, the one or more flex points 450 might be disposed between one or more (but not all) adjacent pairs of each of the one or more segments 410a-410f (i.e., one or more (but not all) of between the sixth and first segments 410f and 410a, respectively, between the first and second segments 410a and 410b, respectively, between the second and third segments 410b and 410c, respectively, between the third and fourth segments 410c and 410d, respectively, and/or between the fourth and fifth segments 410d and 410e, respectively). In some cases, the flex points 450 might comprise an elastomeric or plastic material that is different from the material of the band or wrist band 405, the elastomeric or plastic material configured (in its rest state) to have a compressible spacing along the outer circumference or outer side of the housing 405 (i.e., the side facing away from the body of the user (when worn by the user) or the side on which the display devices 425 and the user selection devices 430 face the user, etc.) and a thinner portion along the inner circumference or inner side of the housing 405 (i.e., the side facing, touching, or next to the body of the user (when worn by the user) or the side opposite the side on which the display devices 425 and the user selection devices 430 face the user, etc.). Alternatively, or additionally, the flex points 450 might each comprise one or more slits formed in the outer side of the housing 405, which might be made of at least one of a molded-over compound, rubber, elastomeric material, plastic material, and/or the like. In some cases, the metal side bands 415 might hold the form of the housing 405 (with or without the elastomeric or plastic material that is compressibly disposed along the outer circumference or outer side of the housing 405, and that may be disposed within the one or more slits, both of which are as described above). As shown in FIG. 4, the flex points 450 might, in some instances, span just the housing 405, without extending in the area of the metal side bands 415. Alternatively, in some cases, the one or more flex points 450 might be extended laterally into the area of the metal side bands 415—that is, each flex point 450 might span both the housing 405 portion and the portions of the metal side bands 415, so that the metal side bands 415 and the housing 405 both simultaneously flex or flex together at each of the flex points 450.

As mentioned above, although the wearable control device 400 is shown as having the form of a bangle, bracelet, or bracer, etc., the wearable control device 400 might have any suitable form, including, but not limited to, that of a wrist watch, a smart watch, a wrist band, a gauntlet, a wrist strap, a finger ring, a head band, or a glove, and/or the like, which might have any suitable number of segments 410 and any suitable number of flex points 450, and may or may not comprise the pair of metal side bands 415. In some cases, depending on the form factor of the wearable control device 400, the two or more of the segments 410a-410f (and the respective components housed therein) might be combined into a single segment, so that the total number of segments might be less than the six segments described with respect to the non-limiting embodiment of FIG. 4. Alternatively, also depending on the form factor of the wearable control device 400, the one or more of the segments 410a-410f (and the respective components housed therein) might each be split into two or more segments, so that the total number of segments might be more than the six segments described with respect to the non-limiting embodiment of FIG. 4.

FIGS. 5A-5C (collectively, "FIG. 5") are schematic diagrams illustrating various user interfaces on the exemplary wearable control device 400 of FIG. 4A for implementing various exemplary embodiments 500, 500', and 500" for remotely controlling various user devices, in accordance with various embodiments. In the non-limiting embodiments of FIG. 5, the user interfaces on the display device 425 (which, in this case, comprises a touchscreen display, which might be a flexible or curved touchscreen display, or the like) might comprise a header portion 505 that might display icons indicating the status of the wearable control device, including, but not limited to, what device(s) are currently being remotely controlled by the wearable control device 400 (e.g., a television as indicated by the television icon in header portion 505 in embodiment 500, a room lights as indicated by the light bulb icon in header portion 505 in embodiment 500', both the television and the room lights as indicated by the television and light bulb icons in header portion 505 in embodiment 500", a speaker (or music playback device) as indicated by the speaker icon in header portion as shown in FIG. 4A, and/or the like). The header portion 505 might further display connectivity icons, including, without limitation, link icons indicating connectivity with one user device (as shown in the embodiments of FIGS. 5A, 5B, and 4A, or the like) or with two user devices (as shown in the embodiment of FIG. 5C, or the like), Z-Wave icons indicating connectivity via Z-Wave connection (as shown in the embodiments of FIGS. 5A and 5C), Bluetooth icons indicating connectivity via Bluetooth connection (as shown in the embodiments of FIGS. 5B and 5C), WiFi icons indicating connectivity via WiFi connection (as shown in the embodiment of FIG. 4A), and/or other suitable connectivity icons, or the like.

In general, depending on the user devices with which the wearable control device 400 is currently paired or connected/linked, the wearable control device 400 might display user interfaces that are customized to the single connected/controlled user device or to a combination or two or more connected/controlled user devices, and might provide the user with options to play video content (as shown by play icon 510a in FIG. 5A), to play music or other audio content (as shown by the play icon in FIG. 4A), to pause video content (as shown by pause icon 510b in FIG. 5C), to change the volume or set mute mode (as shown by the volume bar icons 515 in FIGS. 5A and 5C, and a similar volume bar icon in FIG. 4A), to change illumination levels (as shown by light, illumination, or dimmer bar icon 525 in FIGS. 5B and 5C), and/or the like. The user interfaces might, in some cases, indicate the titles of the media content being displayed on the remotely controlled device (e.g., as depicted by the title icon 520 in FIGS. 5A and 5C, or a similar title icon in FIG. 4A, or the like), or might indicate the user device(s) being controlled (e.g., as depicted by the device name icon 530 in FIG. 5B). Although the user interfaces are depicted in FIGS. 4A, 5A, 5B, and 5C as remotely controlling a music or audio playback device, a television (or video playback device), room lights, and a combination of the television (or video playback device) and room lights, respectively, the various embodiments are not so limited, and the user interfaces might comprise controls or options, including, without limitation, vacuuming the floors of one or more rooms, mopping the floors of one or more rooms, dusting or otherwise cleaning one or more rooms, setting cleaning cycles for washing clothing, setting drying cycles for drying clothing, setting cooking cycles for microwavable food, setting temperature and alert settings for refrigerator temperature and filter changes (and in smart refrigerators, setting alerts for when some foods as monitored by the smart refrigerators expire or are almost used up, thus requiring replenishment or replacement), setting oven temperatures and times, setting cooking temperatures and times for electric or gas stoves, setting cooking temperatures and times for induction cookers, setting cooking temperature, pressure, and times for pressure cooking, setting cooking temperature and times for making rice, setting baking temperature and times for bread-making, setting times for finishing coffee (or tea) brewing, heating water or maintaining particular water temperature, setting cleaning cycles for dishes and utensils, setting alerts for food temperatures, locking or unlocking particular doors, remotely opening or closing particular doors (e.g., front door, patio door, side door, room door, garage door, etc.), remotely locking or unlocking particular windows, remotely opening or closing particular windows, setting options for smart window functionalities, remotely opening or closing window coverings (e.g., vertical blinds, venetian blinds, shutters, etc.) or setting times and orientations for opening/closing window coverings, setting security alarms and settings (or simply authorizing particular guests to enter through particular doors at particular times; setting parameters for motion detectors and security cameras; or viewing security cameras; etc.), changing the temperature, fan settings, and times (or setting programs for temperature, fan settings, and times) for particular rooms or the entire building, controlling user devices (e.g., non-IoT devices or non-wireless/non-remotely-controlled devices) that are plugged into particular electrical outlets/power strips/dimmer switches/data ports/etc., remotely controlling vehicle operations (e.g., driving, navigation, parking, etc.) or alerts for vehicle components (e.g., fuel alerts, low fluid alerts, low tire pressure alerts, alerts for car alarm, etc.), remotely controlling mobile device functionalities, setting clock time or alarm times, setting sprinkler zones, duration, and start times, setting alerts for particular health-related thresholds, setting alerts and parameters for activity tracking, setting parameters and alerts for exercise equipment use, setting notifications for solar energy generation, remotely controlling devices that are controllable only by dedicated remote controllers, remotely controlling devices that are controllable only by dedicated and particular universal remote controllers (or remotely controlling multiple devices that are controlled by a single universal remote controller), remotely communicating via an external telephone system, remotely communicating via an external communications system (other than telephone), remotely controlling desktop computer functionalities, remotely controlling set-top box ("STB") functionalities, remotely controlling gaming console functionalities, remotely controlling image capture device functionalities, remotely controlling video capture device functionalities, remotely controlling printer functionalities, remotely controlling scanner functionalities, remotely controlling image projection functionalities, remotely controlling video projection functionalities, remotely controlling office device functionalities, remotely controlling audio settings for an audio headset, remotely controlling audio settings for earbuds, remotely controlling settings and parameters for virtual reality functionalities, remotely controlling settings and parameters for augmented reality functionalities, remotely controlling settings and parameters for an IoT manager, or remotely controlling or communicating with an external human interface device, and/or the like, for remotely controlling user devices, including, but not limited to, an automated vacuum machine, an automated mopping machine, a cleaning drone, a clothes washing machine, a clothes dryer, a microwave oven, a refrigerator, an oven, a range, a stove, an induction cooktop, a pressure cooker, a rice cooker, a bread maker, a coffee machine, a kettle, a dishwasher, a food thermometer, an automated door locking system, an automated door opening or closing system, an automated window locking system, an automated window opening or closing system, a smart window, a window covering control system, a customer premises security system, a customer premises environmental control system, an electrical outlet/power strip/dimmer switch/data port/etc., a vehicle, a mobile user device (including, without limitation, at least one of a laptop computer, a tablet computer, a smart phone, a mobile phone, a portable gaming device, a personal digital assistant, and/or the like), a clock, a sprinkler system, a medical device, a fitness tracker, exercise equipment, a solar cell or solar cell array, a dedicated remote control device, a universal remote control device, a telephone system, other communications systems, a desktop computer, a STB, a gaming console, an image capture device, a video capture device, a printer, a scanner, an image projection device, a video projection device, an office device, an audio headset, earbuds, virtual reality goggles or headset, augmented reality goggles or headset, an IoT management node, or an IoT human interface device (such as an IoT human interface device as described in detail in the '764 and '710 applications, which have already been incorporated herein by reference in their entirety), and/or the like, respectively. Other functionalities, settings, and parameters may be controlled via one or more appropriate user interfaces for one or more other suitable user devices, without deviating from the scope of the various embodiments as described herein.

The wearable control device 400 of FIGS. 4 and 5 are otherwise similar, if not identical, to the wearable control devices 105 and 305 as described in detail above with respect to FIGS. 1-3, and the descriptions of the wearable control devices 105 and 305 of systems 100-300 of FIGS. 1-3 are applicable to the corresponding wearable control device 400 of FIGS. 4 and 5, respectively FIGS. 6A-6D (collectively, "FIG. 6") are flow diagrams illustrating a method 600 for implementing wearable control functionality, in accordance with various embodiments. Method 600 of FIG. 6A continues onto FIG. 6B following the circular marker denoted, "A," while method 600 of FIG. 6B continues onto FIG. 6C following the circular marker denoted, "B," and method 600 of FIG. 6C continues onto FIG. 6D following the circular marker denoted, "C."

While the techniques and procedures are depicted and/or described in a certain order for purposes of illustration, it should be appreciated that certain procedures may be reordered and/or omitted within the scope of various embodiments. For example, the blocks depicted by the dash-long dash borders denote optional processes. Moreover, while the method 600 illustrated by FIG. 6 can be implemented by or with (and, in some cases, are described below with respect to) the systems 100, 200, and 300 of FIGS. 1, 2, and 3, respectively, (or components thereof) or wearable control device 400 of FIGS. 4 and 5 (or components thereof), such methods may also be implemented using any suitable hardware (or software) implementation. Similarly, while each of the systems 100, 200, and 300 of FIGS. 1, 2, and 3, respectively, (or components thereof) or wearable control device 400 of FIGS. 4 and 5 (or components thereof), can operate according to the method 600 illustrated by FIG. 6 (e.g., by executing instructions embodied on a computer readable medium), the systems 100, 200, and 300 of FIGS. 1, 2, and 3, respectively, or wearable control device 400 of FIGS. 4 and 5 can each also operate according to other modes of operation and/or perform other suitable procedures.

Figure 6A:
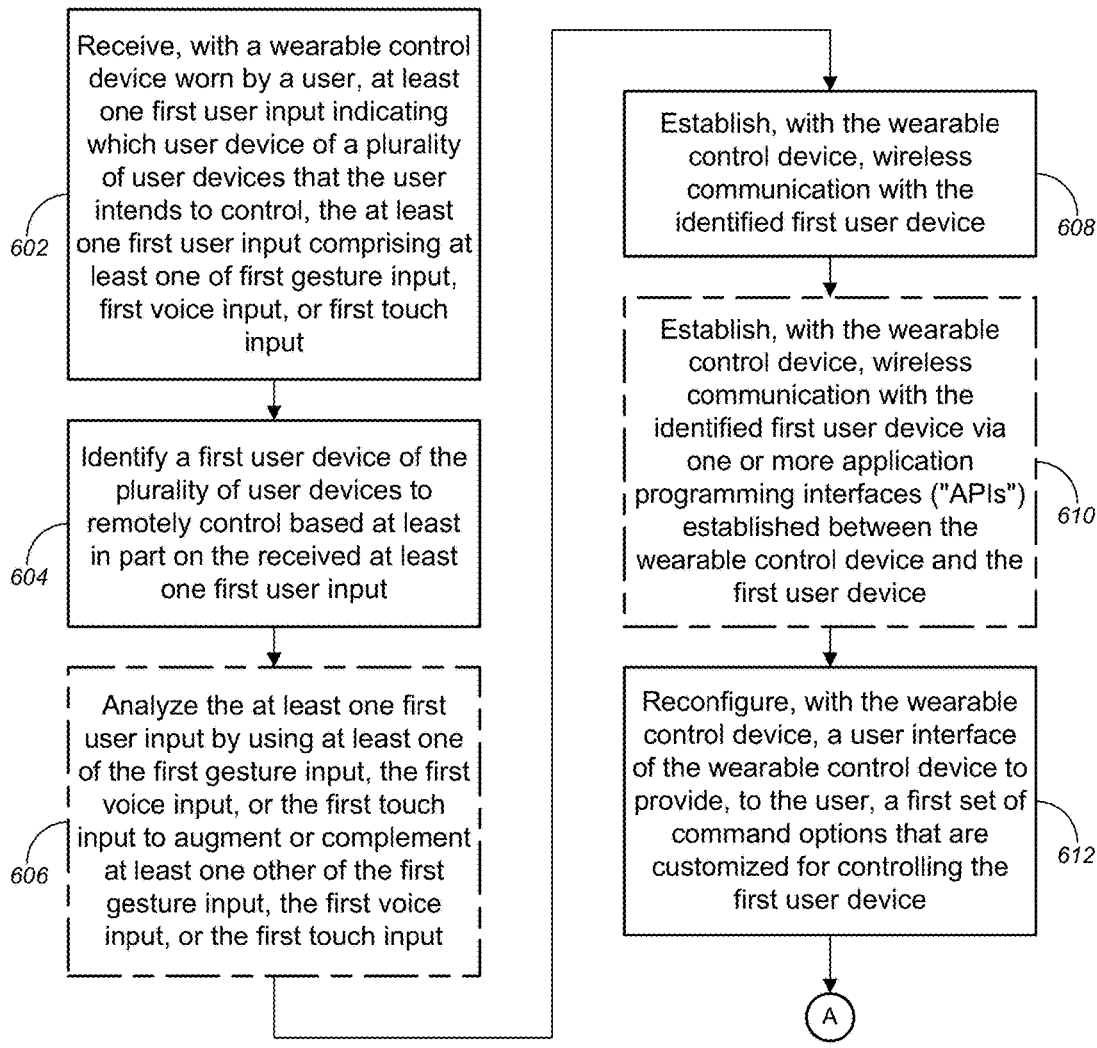
FIGS. 6A-6D are flow diagrams illustrating a method for implementing wearable control functionality, in accordance with various embodiments.

With reference to FIG. 6A, method 600, at block 602, might comprise receiving, with a wearable control device (which might correspond to wearable control devices 105, 305, and 400 of FIGS. 1-5, or the like) worn by a user (which might correspond to users 110 of FIGS. 1 and 2, or the like) and using at least one user input device of the wearable control device (which might correspond to input devices 115a-115n of FIG. 1, or input/output ("I/O") devices 225-255 and 305a of FIGS. 2 and 3, or the like)), at least one first user input indicating which user device of a plurality of user devices (which might correspond to user devices 120a-120n, 315, and 315a-315r of FIGS. 1-3, or the like) that the user intends to control. The at least one first user input might comprise at least one of first gesture input, first voice input, or first touch input, and/or the like. In some instances, the wearable control device has a form comprising one of a bracer, a bracelet, a wrist watch, a smart watch, a wrist band, a bangle, a gauntlet, a wrist strap, a finger ring, a head band, or a glove, and/or the like. In some cases, the wearable control device might include, without limitation, at least one of a wrist strap, a clip, a pin, a clasp, an ear-loop, a finger ring, a toe ring, a bangle, a hook and loop-type strap, eyewear stems, a head band, or a buckle, and/or the like, that allows the wearable control device to be removably affixed to at least one of a wrist of the user, a portion of skin of the user, a limb of the user, an appendage of the user, a torso of the user, a head of the user, or a piece of clothing worn by the user, and/or the like.

In some cases, the plurality of user devices might include, but is not limited to, at least one of one or more display devices, one or more speakers, one or more media recording or playback devices, one or more household appliances, one or more kitchen appliances, one or more lighting systems, one or more automated door locking systems, one or more automated door opening or closing systems, one or more automated window locking systems, one or more automated window opening or closing systems, one or more smart windows, one or more window covering control systems, one or more customer premises security systems, one or more customer premises environmental control systems, one or more electrical outlets, one or more power strips, one or more dimmer switches, one or more data ports, one or more clocks, one or more sprinkler systems, one or more vehicles, one or more mobile user devices, one or more medical devices, one or more fitness trackers, or one or more exercise equipment, and/or the like.

At block 604, method 600 might comprise identifying, with at least one of the wearable control device or a remote computing system, a first user device of the plurality of user devices to remotely control based at least in part on the received at least one first user input. In some instances, the remote computing system (which might correspond to computing system 130 of system 100 in FIG. 1, or the like) might include, without limitation, at least one of a server computer remote from the wearable control device, a gateway device, a human interface device, a cloud computing system, or a distributed computing system that integrates computing resources from two or more user devices of the plurality of user devices, and/or the like. In some embodiments, identifying the first user device (at block 604) might comprise analyzing, with the at least one of the wearable control device or the remote computing system, the at least one first user input by using at least one of the first gesture input, the first voice input, or the first touch input, and/or the like, to augment or complement at least one other of the first gesture input, the first voice input, or the first touch input, and/or the like (at optional block 606).

Method 600 might further comprise, at block 608, establishing, with the wearable control device, wireless communication with the identified first user device. In some cases, the wireless communication might include, but is not limited to, at least one of machine-to-machine Internet of Things ("IoT") communications, Bluetooth communications, Z-wave communications, ZigBee communications, or WiFi communications, and/or the like. According to some embodiments, establishing wireless communication with the identified first user device (at block 608) might comprise establishing, with the wearable control device, wireless communication with the identified first user device via one or more application programming interfaces ("APIs") established between the wearable control device and the first user device (at optional block 610).

At block 612, method 600 might comprise reconfiguring, with the wearable control device, a user interface of the wearable control device to provide, to the user, a first set of command options that are customized for controlling the first user device (a non-limiting example of which is shown, e.g., in the embodiment of FIG. 5A). The process then proceeds to block 614 in FIG. 6B, following the circular marker denoted, "A."

Figure 6B:
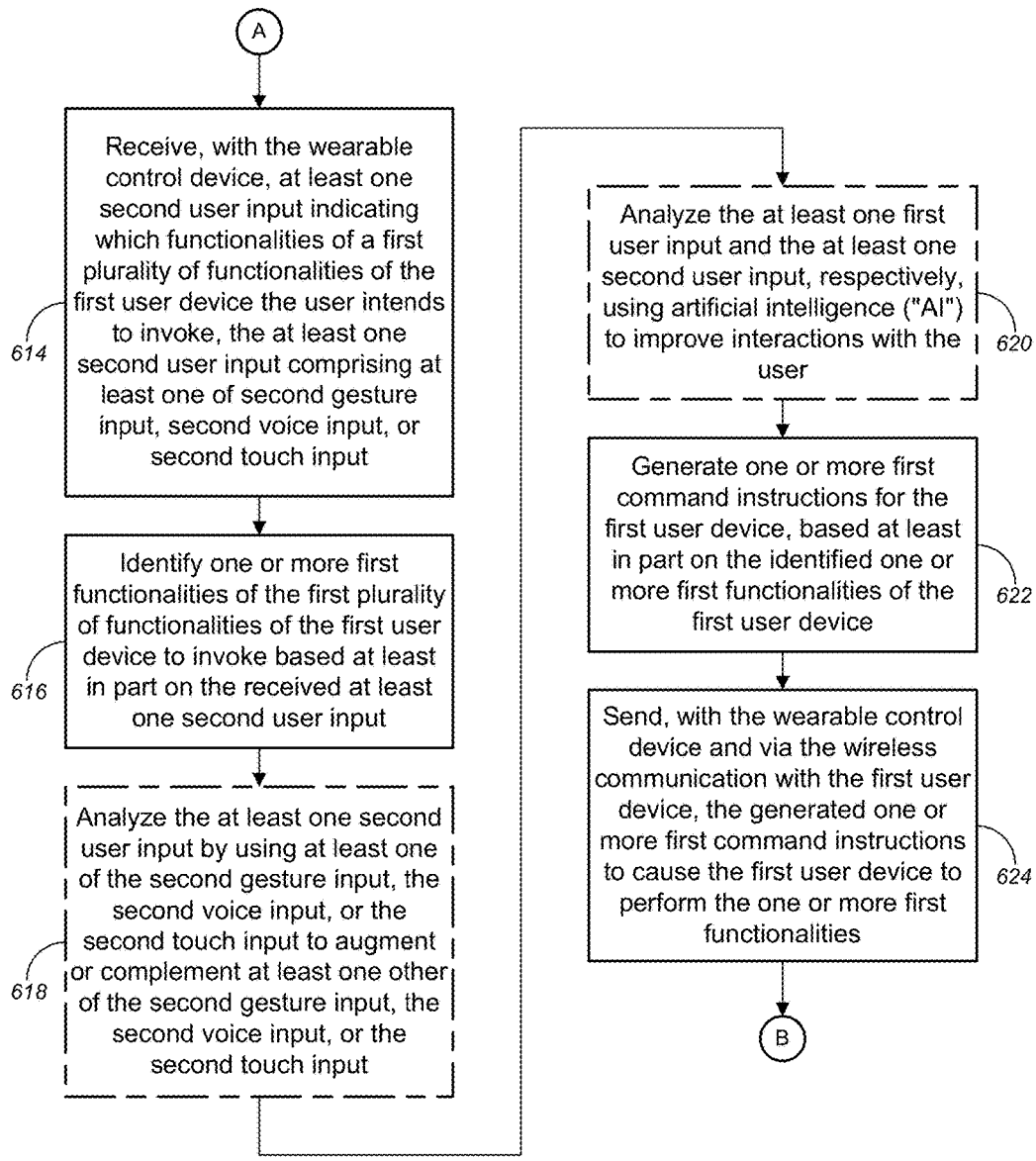

Turning to FIG. 6B, method 600, at block 614, might comprise receiving, with the wearable control device and using the at least one user input device, at least one second user input indicating which functionalities of a first plurality of functionalities of the first user device the user intends to invoke. Merely by way of example, the at least one second user input might comprise at least one of second gesture input, second voice input, or second touch input, and/or the like. According to some embodiments, the at least one user input device might comprise at least one of one or more gesture input devices, one or more voice input devices, or one or more touch input devices, and/or the like. The one or more gesture input devices, in some cases, might include, without limitation, at least one of one or more accelerometers, one or more gyroscopes, one or more motion sensors, one or more location sensors, one or more altitude sensors, one or more tilt sensors, or one or more rotation sensors, and/or the like. The one or more voice input devices, in some instances, might include, but are not limited to, at least one of one or more microphones, one or more sound amplitude detectors, one or more sound frequency detectors, or one or more voice recognition devices, and/or the like. The one or more touch input devices, in some embodiments, might include, without limitation, at least one of a pointer stick (or finger-controlled joystick), one or more touchscreen displays, one or more buttons, one or more switches, one or more toggles, or one or more dials, and/or the like. In some aspects, receiving the at least one first user input (at block 602) might comprise receiving, via at least one of the one or more gesture input devices, the one or more voice input devices, or the one or more touch input devices, and/or the like, corresponding at least one of the first gesture input, the first voice input, or the first touch input, and/or the like, and receiving the at least one second user input (at block 614) might comprise receiving, via at least one of the one or more gesture input devices, the one or more voice input devices, or the one or more touch input devices, and/or the like, corresponding at least one of the second gesture input, the second voice input, or the second touch input, and/or the like.

Method 600, at block 616, might comprise identifying, with the at least one of the wearable control device or the remote computing system, one or more first functionalities of the first plurality of functionalities of the first user device to invoke based at least in part on the received at least one second user input. In some embodiments, identifying the one or more first functionalities of the first user device (at block 616) might comprise analyzing, with the at least one of the wearable control device or the remote computing system, the at least one second user input by using at least one of the second gesture input, the second voice input, or the second touch input, and/or the like, to augment or complement at least one other of the second gesture input, the second voice input, or the second touch input, and/or the like (at optional block 618). According to some embodiments, identifying the first user device (at block 604) and identifying the one or more first functionalities of the first user device (at block 616) might comprise analyzing, with the at least one of the wearable control device or the remote computing system, the at least one first user input and the at least one second user input, respectively, using artificial intelligence ("AI") to improve interactions with the user (at optional block 620). In some cases, the AI might further be utilized to improve machine-to-machine interactions and to improve reconfiguration of the user interface of the wearable control device to provide, to the user, the command options that are customized for controlling the first user device.

At block 622, method 600 might comprise generating, with the at least one of the wearable control device or the remote computing system, one or more first command instructions for the first user device, based at least in part on the identified one or more first functionalities of the first user device.

Method 600 might further comprise, at block 624, sending, with the wearable control device and via the wireless communication with the first user device, the generated one or more first command instructions to cause the first user device to perform the one or more first functionalities. The process then proceeds to optional block 626 in FIG. 6C, following the circular marker denoted, "B."

Figure 6C:
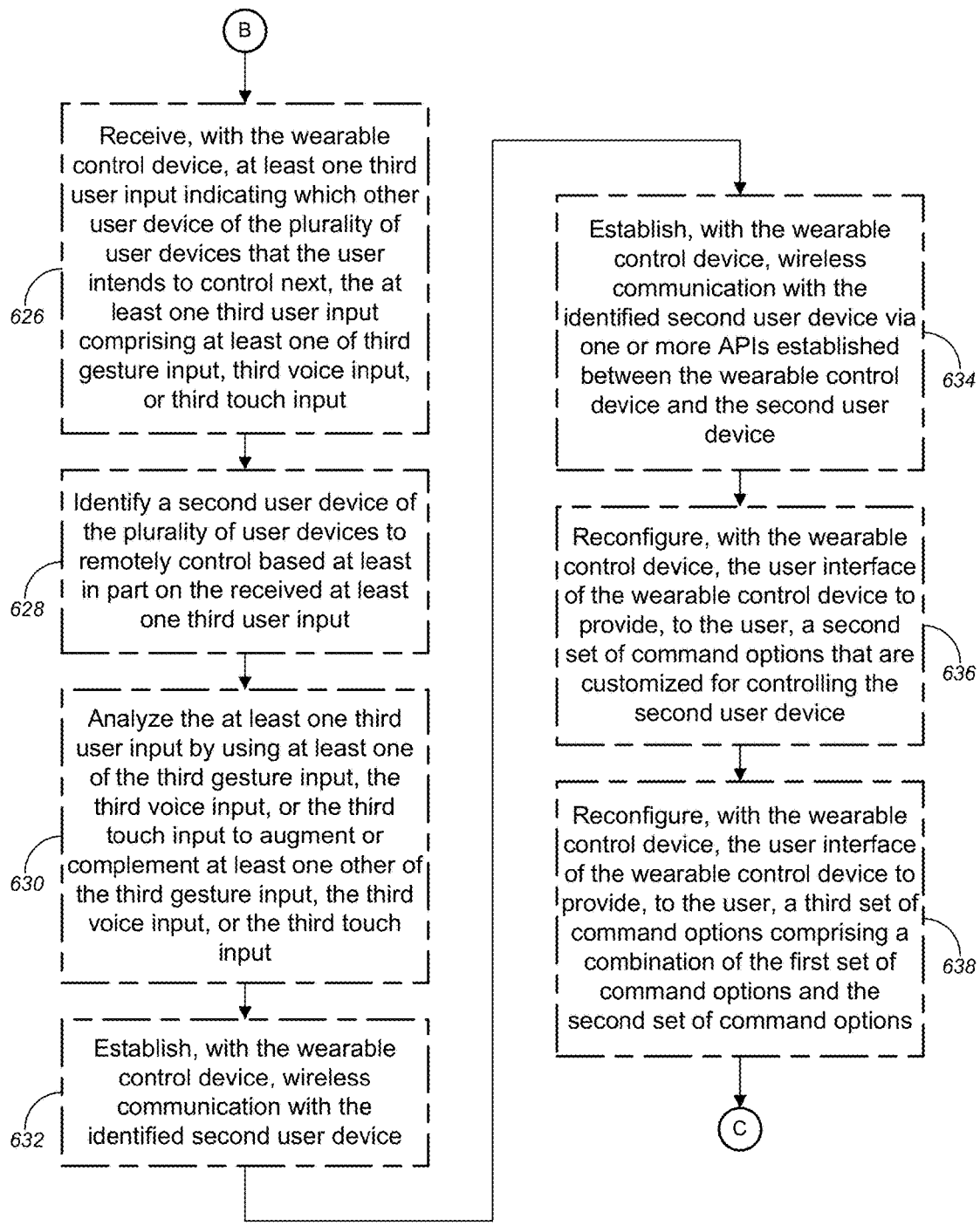

With reference to FIG. 6C, method 600, at optional block 626, might comprise receiving, with the wearable control device, at least one third user input indicating which other user device of the plurality of user devices that the user intends to control next. The at least one third user input might comprise at least one of third gesture input, third voice input, or third touch input, and/or the like.

At optional block 628, method 600 might comprise identifying, with the at least one of the wearable control device or the remote computing system, a second user device of the plurality of user devices to remotely control based at least in part on the received at least one third user input. According to some embodiments, identifying the second user device (at optional block 628) might comprise analyzing, with the at least one of the wearable control device or the remote computing system, the at least one third user input by using at least one of the third gesture input, the third voice input, or the third touch input, and/or the like, to augment or complement at least one other of the third gesture input, the third voice input, or the third touch input, and/or the like (at optional block 630).

Method 600 might further comprise, at optional block 632, establishing, with the wearable control device, wireless communication with the identified second user device. In some cases, the wireless communication might include, but is not limited to, at least one of machine-to-machine Internet of Things ("IoT") communications, Bluetooth communications, Z-wave communications, ZigBee communications, or WiFi communications, and/or the like. According to some embodiments, establishing wireless communication with the identified second user device (at optional block 632) might comprise establishing, with the wearable control device, wireless communication with the identified second user device via one or more APIs established between the wearable control device and the second user device (at optional block 634).

At optional block 636, method 600 might comprise reconfiguring, with the wearable control device, the user interface of the wearable control device to provide, to the user, a second set of command options that are customized for controlling the second user device (a non-limiting example of which is shown, e.g., in the embodiment of FIG. 5B). In some embodiments, the wearable control device might concurrently control both the first user device and the second user device, and method 600 might, at optional block 638, comprise reconfiguring, with the wearable control device, the user interface of the wearable control device to provide, to the user, a third set of command options, the third set of command options comprising a combination of the first set of command options that are customized for controlling the first user device and the second set of command options that are customized for controlling the second user device (a non-limiting example of which is shown, e.g., in the embodiment of FIG. 5C). The process then proceeds to optional block 640 in FIG. 6D, following the circular marker denoted, "C."

Figure 6D:
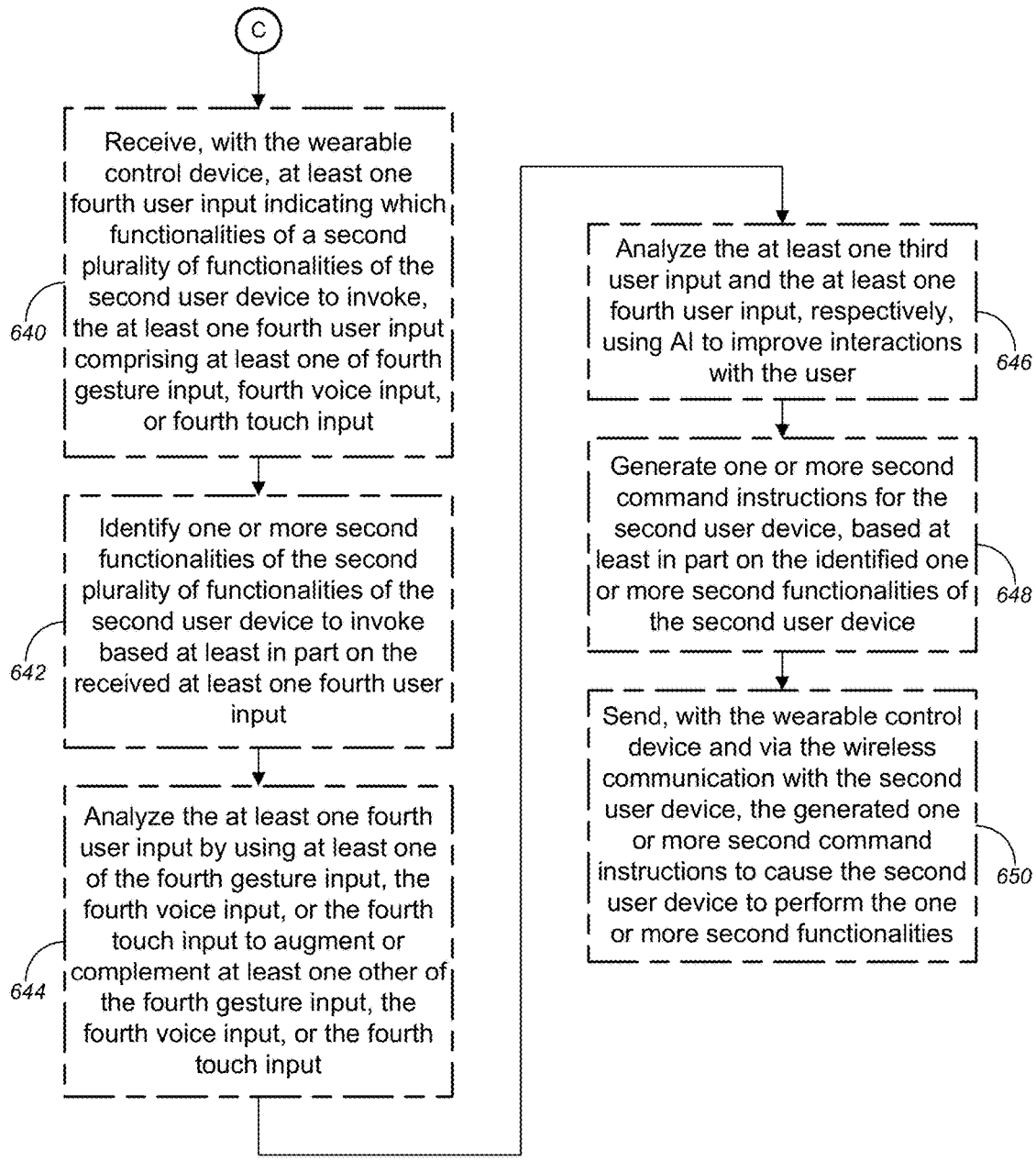

Turning to FIG. 6D, method 600, at optional block 640, might comprise receiving, with the wearable control device, at least one fourth user input indicating which functionalities of a second plurality of functionalities of the second user device the user intends to invoke. The at least one fourth user input might comprise at least one of fourth gesture input, fourth voice input, or fourth touch input, and/or the like.

Method 600, at optional block 642, might comprise identifying, with the at least one of the wearable control device or the remote computing system, one or more second functionalities of the second plurality of functionalities of the second user device to invoke based at least in part on the received at least one fourth user input. In some embodiments, identifying the one or more second functionalities of the second user device (at optional block 642) might comprise analyzing, with the at least one of the wearable control device or the remote computing system, the at least one fourth user input by using at least one of the fourth gesture input, the fourth voice input, or the fourth touch input, and/or the like, to augment or complement at least one other of the fourth gesture input, the fourth voice input, or the fourth touch input, and/or the like (at optional block 644). According to some embodiments, identifying the second user device (at optional block 628) and identifying the one or more second functionalities of the second user device (at optional block 642) might comprise analyzing, with the at least one of the wearable control device or the remote computing system, the at least one third user input and the at least one fourth user input, respectively, using AI to improve interactions with the user (at optional block 646). In some cases, the AI might further be utilized to improve machine-to-machine interactions and to improve reconfiguration of the user interface of the wearable control device to provide, to the user, the command options that are customized for controlling the second user device and/or to provide, to the user, a combination of the command options that are customized for controlling both the first user device and the second user device.

At optional block 648, method 600 might comprise generating, with the at least one of the wearable control device or the remote computing system, one or more second command instructions for the second user device, based at least in part on the identified one or more second functionalities of the second user device. Method 600 might further comprise, at optional block 650, sending, with the wearable control device and via the wireless communication with the second user device, the generated one or more second command instructions to cause the second user device to perform the one or more second functionalities.

Exemplary System and Hardware Implementation

Figure 7:
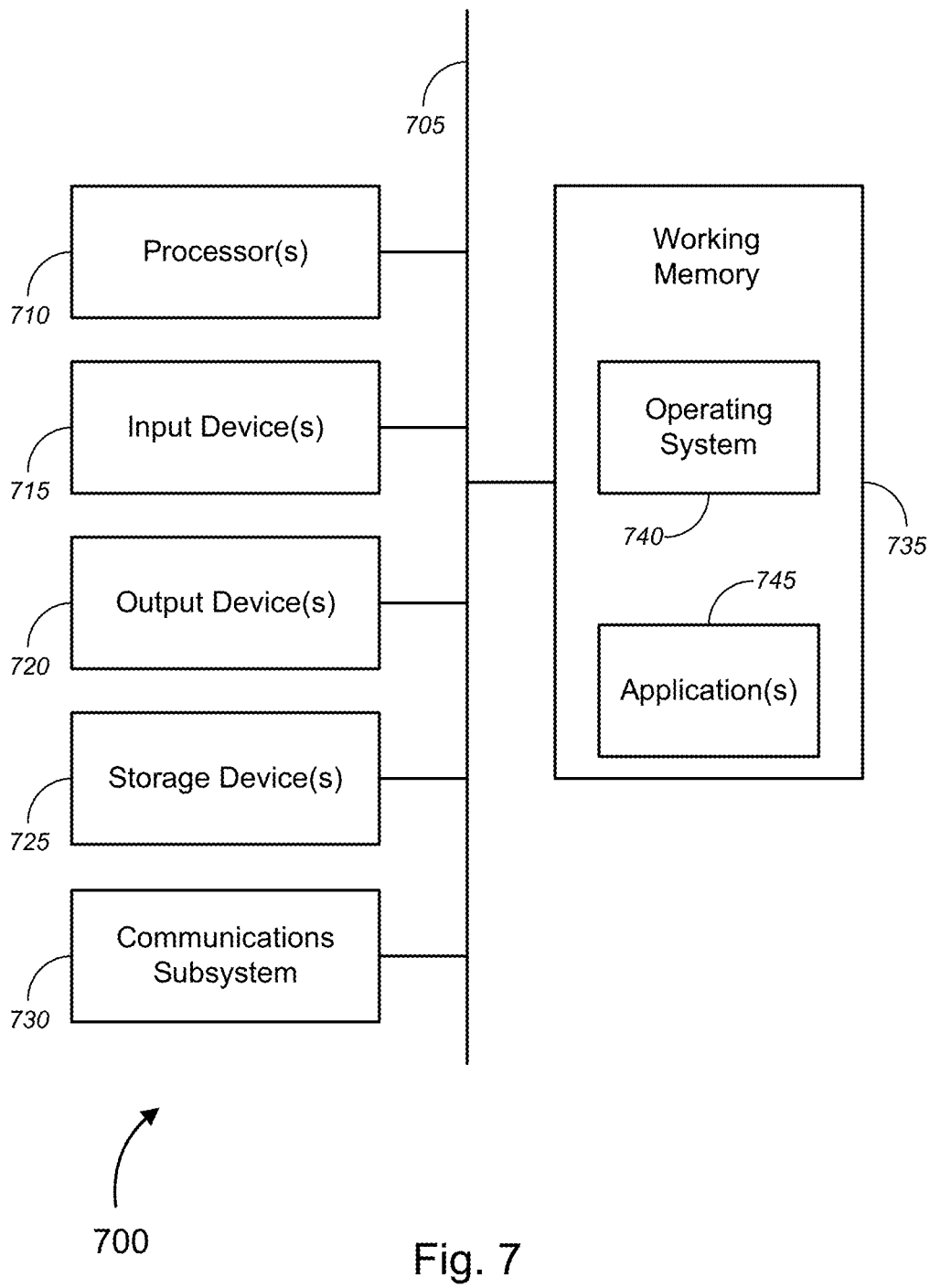
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 of the service provider system hardware that can perform the methods provided by various other embodiments, as described herein, and/or can perform the functions of computer or hardware system (i.e., wearable control devices 105, 305, and 400, input/output ("I/O") devices 115a-115n, 225-255 and 305a, user devices 120a-120n, 315, and 315a-315r, Internet of Things ("IoT")-capable sensors 125a-125n, 310, and 310a-310h, computing system 130, analytics engine 150, etc.), as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an embodiment of the computer or hardware system (i.e., wearable control devices 105, 305, and 400, I/O devices 115a-115n, 225-255 and 305a, user devices 120a-120n, 315, and 315a-315r, IoT-capable sensors 125a-125n, 310, and 310a-310h, computing system 130, analytics engine 150, etc.), described above with respect to FIGS. 1-6—is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and/or the like); one or more input devices 715, which can include, without limitation, a mouse, a keyboard, and/or the like; and one or more output devices 720, which can include, without limitation, a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 700 might also include a communications subsystem 730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, a Z-Wave device, a ZigBee device, cellular communication facilities, etc.), and/or the like. The communications subsystem 730 may permit data to be exchanged with a network (such as the network described below, to name one example), with other computer or hardware systems, and/or with any other devices described herein. In many embodiments, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments of the invention. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH- EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
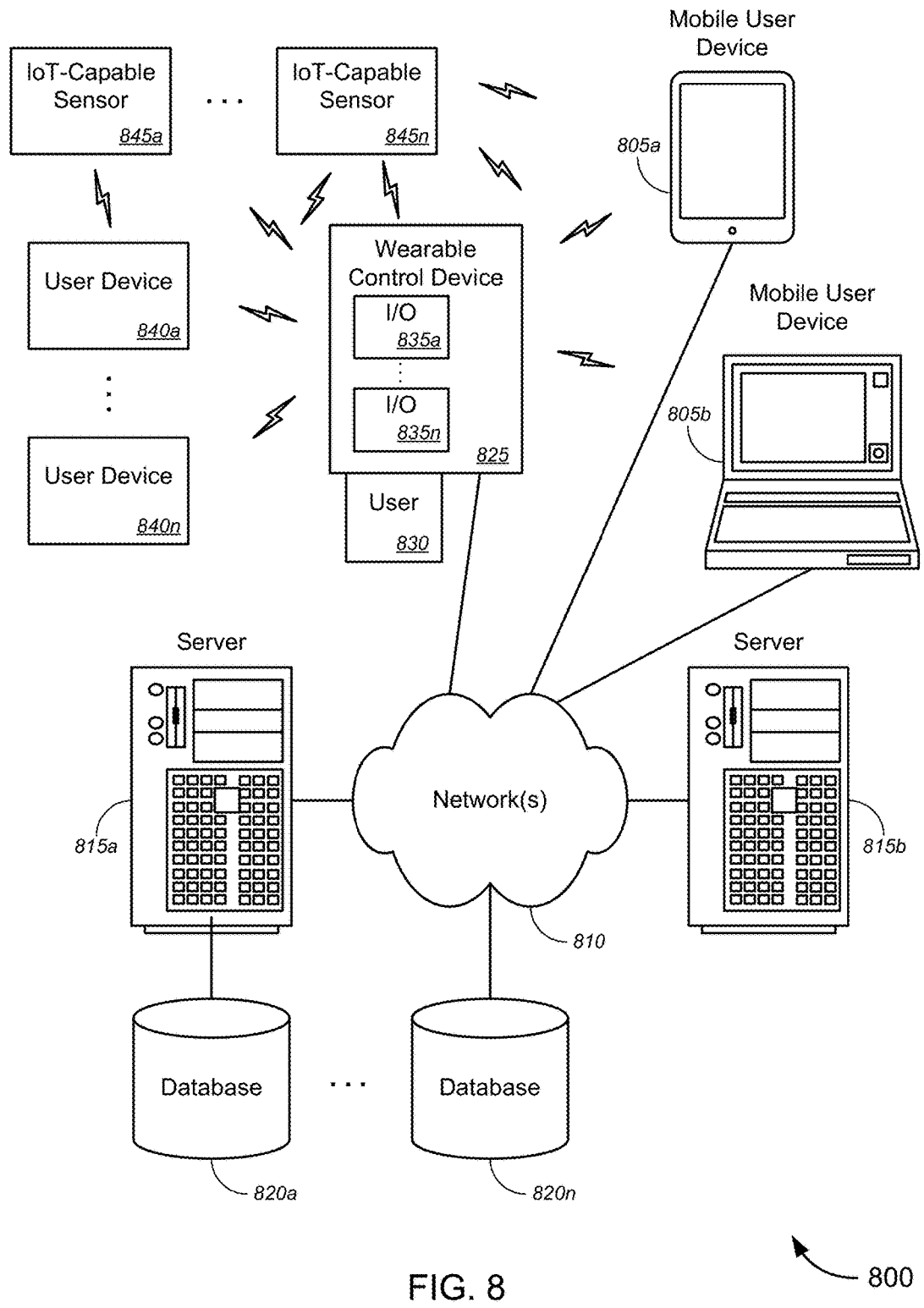
FIG. 8 is a block diagram illustrating an example of a networked system of computers, computing systems, or system hardware architecture, which can be used in accordance with various embodiments.

As noted above, a set of embodiments comprises methods and systems for implementing Internet of Things functionality, and, in particular embodiments, to methods, systems, apparatus, and computer software for implementing wearable control functionality. FIG. 8 illustrates a schematic diagram of a system 800 that can be used in accordance with various embodiments. The system 800 can each include one or more user computers, user devices, or customer devices 805. A mobile user computer, user device, or customer device 805 can be a general purpose personal computer (including, merely by way of example, desktop computers, tablet computers, laptop computers, handheld computers, smart phones, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 805 can also have any of a variety of applications, including one or more applications configured to perform methods provided by various embodiments (as described above, for example), as well as one or more office applications, database client and/or server applications, and/or web browser applications. Alternatively, a user computer, user device, or customer device 805 can be any other electronic device, such as a thin-client computer, Internet-enabled mobile telephone, and/or personal digital assistant, capable of communicating via a network (e.g., the network(s) 810 described below) and/or of displaying and navigating web pages or other types of electronic documents. Although the exemplary system 800 is shown with two user computers, user devices, or customer devices 805, any number of user computers, user devices, or customer devices can be supported.

Certain embodiments operate in a networked environment, which can include a network(s) 810. The network(s) 810 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 810 (similar to network 135 of FIGS. 1 and 2, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 805 and/or another server 815. In some embodiments, an application server can perform one or more of the processes for implementing Internet of Things functionality, and, in particular embodiments, to methods, systems, apparatus, and computer software for implementing wearable control functionality, or the like, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer, user device, or customer device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820a-820n (collectively, "databases 820"). The location of each of the databases 820 is discretionary: merely by way of example, a database 820a might reside on a storage medium local to (and/or resident in) a server 815a (and/or a user computer, user device, or customer device 805). Alternatively, a database 820n can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle database, that is adapted to store, update, and retrieve data in response to SQL-formatted commands. The database might be controlled and/or maintained by a database server, as described above, for example.

With reference to FIG. 8, according to some embodiments, system 800 might further comprise a wearable control device 825 (similar to wearable control devices 105, 305, and 400 of FIGS. 1-5, or the like) that is either worn by a user 830, one or more input/output ("I/O") devices 835a-835n (collectively, "I/O devices 835" or "devices 835," or the like; similar to input devices 115a-115n of FIG. 1, I/O devices 225-255 and 305a of FIGS. 2 and 3, or the like) that are disposed within the wearable control device 825, one or more user devices 840a-840n (collectively, "user devices 840" or "devices 840," or the like; similar to user devices 120a-120n, 315, and 315a-315r of FIGS. 1-3, or the like) and one or more IoT-capable sensors 845a-845n (collectively, "IoT-capable sensors 845" or "sensors 845," or the like; similar to IoT-capable sensors 125a-125n, 310, and 310a-310h of FIGS. 1-3, or the like).

In operation, the wearable control device 825 (when worn by the user 830) might receive at least one first user input indicating which user device of a plurality of user devices 805 or 840 that the user intends to control. The at least one first user input might comprise at least one of first gesture input, first voice input, or first touch input, and/or the like. The wearable control device 825 and/or a remote computing system (e.g., server 815a or 815b (which might correspond to computing system 130 of system 100 of FIG. 1, or the like)) might identify a first user device 805 or 840 of the plurality of user devices to remotely control based at least in part on the received at least one first user input. The wearable device 825 might establish wireless communication with the identified first user device 805 or 840, and might reconfigure a user interface of the wearable control device 825 to provide, to the user 830, a first set of command options that are customized for controlling the first user device 805 or 840. The wearable control device 825 might subsequently receive at least one second user input indicating which functionalities of a first plurality of functionalities of the first user device the user intends to invoke. The at least one second user input might comprise at least one of second gesture input, second voice input, or second touch input, and/or the like. The wearable control device 825 and/or a remote computing system (e.g., server 815a or 815b) might identify one or more first functionalities of the first plurality of functionalities of the first user device to invoke based at least in part on the received at least one second user input, and might generate one or more first command instructions for the first user device 805 or 840, based at least in part on the identified one or more first functionalities of the first user device. The wearable control device might subsequently send the generated one or more first command instructions to cause the first user device 805 or 840 to perform the one or more first functionalities.

In some cases, the one or more user devices 840a-840n might comprise the mobile user computer, user device, or customer device 805a or 805b. The machine-to-machine communications between the wearable control device 825 and each of the user devices 805a or 805b, the user devices 840a-840n, and the IoT-capable sensors 845a-845n are represented in FIG. 8 by the lightning bolt symbols, which in some cases denotes wireless communications (although, in some instances, need not be wireless, but can be wired communications). These and other functions of the system 800 (and its components) are described in greater detail above with respect to FIGS. 1-6.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    receiving, with a wearable control device worn by a user, at least one first user input indicating which user device of a plurality of user devices that the user intends to control, the at least one first user input comprising at least one of first gesture input, first voice input, or first touch input;
    identifying, with at least one of the wearable control device or a remote computing system, a first user device of the plurality of user devices to remotely control based at least in part on the received at least one first user input;
    establishing, with the wearable control device, wireless communication with the identified first user device;
    reconfiguring, with the wearable control device, a user interface of the wearable control device to provide, to the user, a first set of command options that are customized for controlling the first user device;
    receiving, with the wearable control device, at least one second user input indicating which functionalities of a first plurality of functionalities of the first user device the user intends to invoke, the at least one second user input comprising at least one of second gesture input, second voice input, or second touch input;
    identifying, with the at least one of the wearable control device or the remote computing system, one or more first functionalities of the first plurality of functionalities of the first user device to invoke based at least in part on the received at least one second user input;
    generating, with the at least one of the wearable control device or the remote computing system, one or more first command instructions for the first user device, based at least in part on the identified one or more first functionalities of the first user device; and
    sending, with the wearable control device and via the wireless communication with the first user device, the generated one or more first command instructions to cause the first user device to perform the one or more first functionalities.

2. The method of claim 1, wherein the wearable control device has a form comprising one of a bracer, a bracelet, a wrist watch, a smart watch, a wrist band, a bangle, a gauntlet, a wrist strap, a finger ring, a head band, or a glove.

3. The method of claim 1, wherein the plurality of user devices comprises at least one of one or more display devices, one or more speakers, one or more media recording or playback devices, one or more household appliances, one or more kitchen appliances, one or more lighting systems, one or more automated door locking systems, one or more automated door opening or closing systems, one or more automated window locking systems, one or more automated window opening or closing systems, one or more smart windows, one or more window covering control systems, one or more customer premises security systems, one or more customer premises environmental control systems, one or more electrical outlets, one or more power strips, one or more dimmer switches, one or more data ports, one or more clocks, one or more sprinkler systems, one or more vehicles, one or more mobile user devices, one or more medical devices, one or more fitness trackers, or one or more exercise equipment.

4. The method of claim 1, wherein the wireless communication comprises at least one of machine-to-machine Internet of Things ("IoT") communications, Bluetooth communications, Z-wave communications, ZigBee communications, or WiFi communications.

5. The method of claim 1, wherein establishing wireless communication with the identified first user device comprises establishing, with the wearable control device, wireless communication with the identified first user device via one or more application programming interfaces ("APIs") established between the wearable control device and the first user device.

6. The method of claim 1, wherein identifying the first user device comprises analyzing, with the at least one of the wearable control device or the remote computing system, the at least one first user input by using at least one of the first gesture input, the first voice input, or the first touch input to augment or complement at least one other of the first gesture input, the first voice input, or the first touch input.

7. The method of claim 1, wherein identifying the one or more first functionalities of the first user device comprises analyzing, with the at least one of the wearable control device or the remote computing system, the at least one second user input by using at least one of the second gesture input, the second voice input, or the second touch input to augment or complement at least one other of the second gesture input, the second voice input, or the second touch input.

8. The method of claim 1, wherein identifying the first user device and identifying the one or more first functionalities of the first user device comprise analyzing, with the at least one of the wearable control device or the remote computing system, the at least one first user input and the at least one second user input, respectively, using artificial intelligence ("AI") to improve interactions with the user.

9. The method of claim 8, wherein the AI is further utilized to improve machine-to-machine interactions and to improve reconfiguration of the user interface of the wearable control device to provide, to the user, the command options that are customized for controlling the first user device.

10. The method of claim 1, wherein the remote computing system comprises at least one of a server computer remote from the wearable control device, a gateway device, a human interface device, a cloud computing system, or a distributed computing system that integrates computing resources from two or more user devices of the plurality of user devices.

11. The method of claim 1, further comprising:
    receiving, with the wearable control device, at least one third user input indicating which other user device of the plurality of user devices that the user intends to control next, the at least one third user input comprising at least one of third gesture input, third voice input, or third touch input;
    identifying, with the at least one of the wearable control device or the remote computing system, a second user device of the plurality of user devices to remotely control based at least in part on the received at least one third user input;

establishing, with the wearable control device, wireless communication with the identified second user device;

reconfiguring, with the wearable control device, the user interface of the wearable control device to provide, to the user, a second set of command options that are customized for controlling the second user device, the second set of command options being different from the first set of command options;

receiving, with the wearable control device, at least one fourth user input indicating which functionalities of a second plurality of functionalities of the second user device to invoke, the at least one fourth user input comprising at least one of fourth gesture input, fourth voice input, or fourth touch input;

identifying, with the at least one of the wearable control device or the remote computing system, one or more second functionalities of the second plurality of functionalities of the second user device to invoke based at least in part on the received at least one fourth user input;

generating, with the at least one of the wearable control device or the remote computing system, one or more second command instructions for the second user device, based at least in part on the identified one or more second functionalities of the second user device; and sending, with the wearable control device and via the wireless communication with the second user device, the generated one or more second command instructions to cause the second user device to perform the one or more second functionalities.

12. The method of claim 11, wherein the wearable control device concurrently controls both the first user device and the second user device, wherein reconfiguring the user interface comprises reconfiguring, with the wearable control device, the user interface of the wearable control device to provide, to the user, a third set of command options, the third set of command options comprising a combination of the first set of command options that are customized for controlling the first user device and the second set of command options that are customized for controlling the second user device.

13. A wearable control device worn by a user, the wearable control device comprising:
   at least one processor;
   at least one user input device;
   a user interface;
   at least one transceiver; and
   a non-transitory computer readable medium communicatively coupled to the at least one processor, the non-transitory computer readable medium having stored thereon computer software comprising a set of instructions that, when executed by the at least one processor, causes the wearable control device to:
      receive, via the at least one user input device, at least one first user input, the at least one first user input indicating which user device of a plurality of user devices that the user intends to control, the at least one first user input comprising at least one of first gesture input, first voice input, or first touch input;
      identify a first user device of the plurality of user devices to remotely control based at least in part on the received at least one first user input;
      establish, via the at least one transceiver, wireless communication with the identified first user device;
      reconfigure the user interface to provide, to the user, a first set of command options that are customized for controlling the first user device;
      receive, via the at least one user input device, at least one second user input, the at least one second user input indicating which functionalities of a first plurality of functionalities of the first user device the user intends to invoke, the at least one second user input comprising at least one of second gesture input, second voice input, or second touch input;
      identify one or more first functionalities of the first plurality of functionalities of the first user device to invoke based at least in part on the received at least one second user input;
      generate one or more first command instructions for the first user device, based at least in part on the identified one or more first functionalities of the first user device; and
      sending, via the at least one transceiver via the wireless communication with the first user device, the generated one or more first command instructions to cause the first user device to perform the one or more first functionalities.

14. The wearable control device of claim 13, wherein the wearable control device has a form comprising one of a bracer, a bracelet, a wrist watch, a smart watch, a wrist band, a bangle, a gauntlet, a wrist strap, a finger ring, a head band, or a glove.

15. The wearable control device of claim 13, wherein the plurality of user devices comprises at least one of one or more display devices, one or more speakers, one or more media recording or playback devices, one or more household appliances, one or more kitchen appliances, one or more lighting systems, one or more automated door locking systems, one or more automated door opening or closing systems, one or more automated window locking systems, one or more automated window opening or closing systems, one or more smart windows, one or more window covering control systems, one or more customer premises security systems, one or more customer premises environmental control systems, one or more electrical outlets, one or more power strips, one or more dimmer switches, one or more data ports, one or more clocks, one or more sprinkler systems, one or more vehicles, one or more mobile user devices, one or more medical devices, one or more fitness trackers, or one or more exercise equipment.

16. The wearable control device of claim 13, wherein the at least one transceiver is configured to provide wireless communications with one or more user devices of the plurality of user devices, the wireless communications comprising at least one of machine-to-machine Internet of Things ("IoT") communications, Bluetooth communications, Z-wave communications, ZigBee communications, or WiFi communications.

17. The wearable control device of claim 13, wherein establishing wireless communication with the identified first user device comprises establishing wireless communication with the identified first user device via one or more application programming interfaces ("APIs") established between the wearable control device and the first user device.

18. The wearable control device of claim 13, identifying the first user device comprises analyzing the at least one first user input by using at least one of the first gesture input, the first voice input, or the first touch input to augment or complement at least one other of the first gesture input, the first voice input, or the first touch input.

19. The wearable control device of claim 13, wherein identifying the one or more first functionalities of the first user device comprises analyzing the at least one second user input by using at least one of the second gesture input, the second voice input, or the second touch input to augment or complement at least one other of the second gesture input, the second voice input, or the second touch input.

20. The wearable control device of claim 13, wherein identifying the first user device and identifying the one or more first functionalities of the first user device comprise analyzing the at least one first user input and the at least one second user input, respectively, using artificial intelligence ("AI") to improve interactions with the user.

21. The wearable control device of claim 20, wherein the AI is further utilized to improve machine-to-machine interactions and to improve reconfiguration of the user interface of the wearable control device to provide, to the user, the command options that are customized for controlling the first user device.

22. The wearable control device of claim 13, wherein identifying the first user device and identifying the one or more first functionalities of the first user device comprise identifying, with at least one of the wearable control device or a remote computing system, the first user device and the one or more first functionalities of the first user device, respectively, wherein the remote computing system comprises at least one of a server computer remote from the wearable control device, a gateway device, a human interface device, a cloud computing system, or a distributed computing system that integrates computing resources from two or more user devices of the plurality of user devices.

23. The wearable control device of claim 13, wherein the set of instructions, when executed by the at least one processor, further causes the wearable control device to:
  receive, via the at least one user input device, at least one third user input, the at least one third user input indicating which other user device of the plurality of user devices that the user intends to control next, the at least one third user input comprising at least one of third gesture input, third voice input, or third touch input;
  identify a second user device of the plurality of user devices to remotely control based at least in part on the received at least one third user input;
  establish, via the at least one transceiver, wireless communication with the identified second user device;
  reconfigure the user interface to provide, to the user, a second set of command options that are customized for controlling the second user device, the second set of command options being different from the first set of command options;
  receive, via the at least one user input device, at least one fourth user input, the at least one fourth user input indicating which functionalities of a second plurality of functionalities of the second user device to invoke, the at least one fourth user input comprising at least one of fourth gesture input, fourth voice input, or fourth touch input;
  identify one or more second functionalities of the second plurality of functionalities of the second user device to invoke based at least in part on the received at least one fourth user input;
  generate one or more second command instructions for the second user device, based at least in part on the identified one or more second functionalities of the second user device; and
  send, via the at least one transceiver via the wireless communication with the second user device, the generated one or more second command instructions to cause the second user device to perform the one or more second functionalities.

24. The wearable control device of claim 13, wherein the wearable control device concurrently controls both the first user device and the second user device, wherein reconfiguring the user interface comprises reconfiguring the user interface to provide, to the user, a third set of command options, the third set of command options comprising a combination of the first set of command options that are customized for controlling the first user device and the second set of command options that are customized for controlling the second user device.

25. The wearable control device of claim 13, wherein the at least one user input device comprises at least one of one or more gesture input devices, one or more voice input devices, or one or more touch input devices, wherein the one or more gesture input devices comprise one or more accelerometers, one or more gyroscopes, one or more motion sensors, one or more location sensors, one or more altitude sensors, one or more tilt sensors, or one or more rotation sensors, wherein the one or more voice input devices comprise one or more microphones, one or more sound amplitude detectors, one or more sound frequency detectors, or one or more voice recognition devices, wherein the one or more touch input devices comprise a pointer stick, one or more touchscreen displays, one or more buttons, one or more switches, one or more toggles, or one or more dials, wherein receiving the at least one first user input comprises receiving, via at least one of the one or more gesture input devices, the one or more voice input devices, or the one or more touch input devices, corresponding at least one of the first gesture input, the first voice input, or the first touch input, wherein receiving the at least one second user input comprises receiving, via at least one of the one or more gesture input devices, the one or more voice input devices, or the one or more touch input devices, corresponding at least one of the second gesture input, the second voice input, or the second touch input.

26. The wearable control device of claim 13, further comprising at least one of a wrist strap, a clip, a pin, a clasp, an ear-loop, a finger ring, a toe ring, a bangle, a hook and loop-type strap, eyewear stems, a head band, or a buckle that allows the wearable control device to be removably affixed to at least one of a wrist of the user, a portion of skin of the user, a limb of the user, an appendage of the user, a torso of the user, a head of the user, or a piece of clothing worn by the user.

* * * * *